United States Patent
Suzuki

(10) Patent No.: US 8,649,258 B2
(45) Date of Patent: Feb. 11, 2014

(54) RELAY APPARATUS, DATA RELAY METHOD, AND COMMUNICATION SYSTEM

(75) Inventor: Kiyotaka Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 317 days.

(21) Appl. No.: 12/962,797

(22) Filed: Dec. 8, 2010

(65) Prior Publication Data

US 2011/0142103 A1    Jun. 16, 2011

(30) Foreign Application Priority Data

Dec. 11, 2009   (JP) .................. 2009-282251

(51) Int. Cl.
*G01R 31/08*    (2006.01)
*H04L 12/28*    (2006.01)

(52) U.S. Cl.
USPC ........................................ 370/216; 370/389

(58) Field of Classification Search
USPC ......... 370/216–228, 389, 400, 391, 392, 393, 370/410, 426, 351, 468, 469, 395.21, 395.4, 370/396–399, 240–242, 245, 247, 238; 709/238–239
See application file for complete search history.

(56) References Cited

U.S. PATENT DOCUMENTS

| 6,856,593 | B2 | 2/2005 | Nakajima |
| 7,710,860 | B2 * | 5/2010 | Kano ............................ 370/216 |
| 7,986,618 | B2 * | 7/2011 | Charny et al. ................. 370/221 |
| 8,130,637 | B2 * | 3/2012 | Owens et al. ................. 370/218 |
| 2009/0323522 | A1 * | 12/2009 | Deguchi ........................ 370/228 |

FOREIGN PATENT DOCUMENTS

| JP | 2001-339431 | 12/2001 |
| JP | 2005-73211 A | 3/2005 |
| JP | 2008-42648 A | 2/2008 |

* cited by examiner

*Primary Examiner* — Hanh N Nguyen

(74) *Attorney, Agent, or Firm* — Fujitsu Patent Center

(57) ABSTRACT

A relay apparatus includes: a transfer unit to transfer data from a preceding-stage communication apparatus to a subsequent-stage communication apparatus; a receiving unit to receive abnormality information indicating an abnormality of the data transferred by the transfer unit from the subsequent-stage communication apparatus; and a switching unit to switch a transfer destination of the data by the transfer unit on a basis of the abnormality information received by the receiving unit.

17 Claims, 17 Drawing Sheets

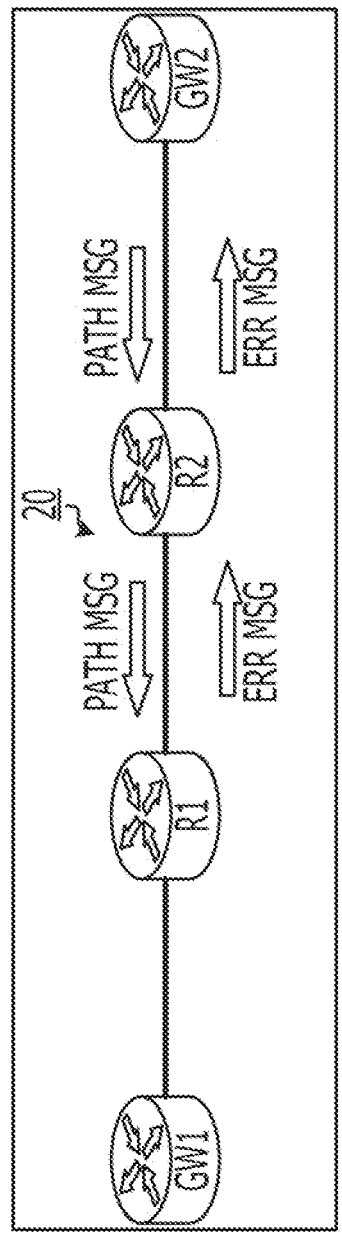
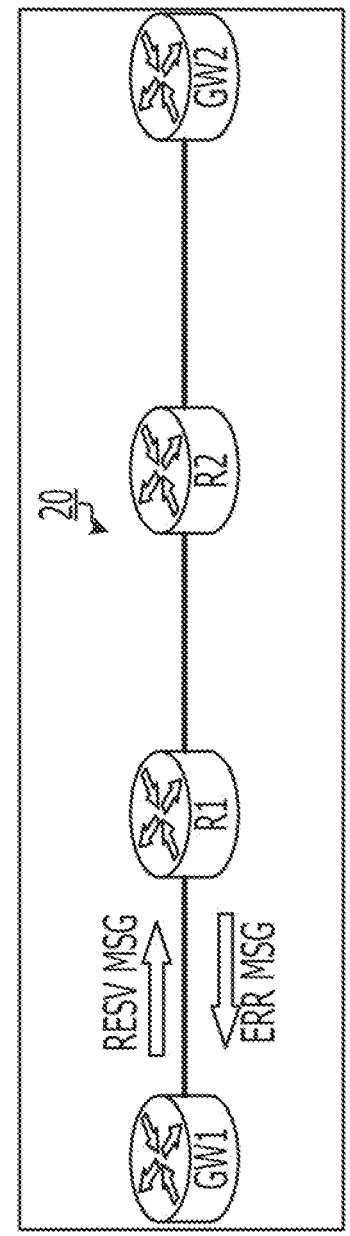

FIG. 16

| Table | DestIP | O inf | NextHop | Mon | ErrST | RP |
|---|---|---|---|---|---|---|
| R1 | GW2 | R1~R2 | R2 | Normal | Normal | 1 |
| R2 | GW2 | R1~R3 | R3 | Normal | Normal | 2 |
| R3 | GW2 | R2~R4 | R4 | Normal | Normal | 1 |
| R4 | GW2 | R3~R4 | R4 | Normal | Normal | 1 |
|  | GW2 | R4~GW2 | — | Normal | Normal | 1 |

FIG. 17

| Table | DestIP | O inf | NextHop | Mon | ErrST | RP |
|---|---|---|---|---|---|---|
| R1 | GW2 | R1~R2 | R2 | Normal | Normal | Unused |
| R2 | GW2 | R1~R3 | R3 | Normal | Normal | 1 |
| R3 | GW2 | R2~R4 | R4 | Normal | Error | Unused |
| R4 | GW2 | R3~R4 | R4 | Normal | Normal | 1 |
| | GW2 | R4~GW2 | — | Error | Normal | 1 |

170

US 8,649,258 B2

RELAY APPARATUS, DATA RELAY METHOD, AND COMMUNICATION SYSTEM

CROSS-REFERENCE TO RELATED APPLICATIONS

This application is based upon and claims the benefit of priority from the prior Japanese Patent Application No. 2009-282251 filed on Dec. 11, 2009, the entire contents of which are incorporated herein by reference.

FIELD

The embodiments discussed herein are related to a relay apparatus relaying, a data relay method, and a communication system.

BACKGROUND

As one of processing functions of Voice over Internet Protocol (VoIP) that terminates Real-time Transport Protocol (RTP) and RTP Control Protocol (RTCP), call-disconnection watchdog timer processing is provided. In the call-disconnection watchdog timer processing, RTP and RTCP transfers are monitored in talking, and if both packets cannot be received for a specified time period, a call is terminated. For example, as call termination processing, a "BYE" message is generated in Session Initiation Protocol (SIP), for example.

A network communication path, through which the same voice quality as that of a fixed-line telephone network is required, is constructed by a device, such as a router, etc., in which Resource reSerVation Protocol (RSVP) is implemented, for example. Such a network communication path employs a redundant configuration which is a network configuration reducing or preventing communication paths from going down when a failure occurs in the device.

If an abnormality occurs in an RSVP refresh message, resource bandwidth reservation of a relay router is deleted, and a gateway determines that the quality of the communication path cannot be maintained, and thus terminates a call. If an abnormality is detected by call-disconnection monitoring, the gateway terminates a call, and deletes resource bandwidth reservation of the relay router by an RSVP disconnection message.

In this case, the gateway of a call transmission source might have failed, and thus it is not possible to determine that the relay router has failed unconditionally. However, if the relay router has failed, when a new call goes through the failed relay router, a call disconnection occurs again, and reliability of communication cannot be maintained. And thus, it takes time to search for a location where the failure has occurred.

As a method of monitoring a telephone speech quality, there is a method of detecting an abnormality of the telephone speech by monitoring RTP and RTCP. In the case where RTP and RTCP are monitored only by a gateway, if an abnormality occurs at any one of relay routers constituting a network, it takes time to search for a failure, namely, to identify the occurrence location of the abnormality.

Thus, in order to detect an abnormality of a network, it is thought that an RTP/RTCP monitor is also implemented in relay routers constituting the network.

For example, Japanese Laid-open Patent Publication No. 2005-73211 has disclosed a method of notifying an abnormality detected by a relay router to a server that monitors relay routers, maintenance personnel, etc., as a quality report.

SUMMARY

According to an aspect of the invention, a relay apparatus includes: a transfer unit to transfer data from a preceding-stage communication apparatus to a subsequent-stage communication apparatus; a receiving unit to receive abnormality information indicating an abnormality of the data transferred by the transfer unit from the subsequent-stage communication apparatus; and a switching unit to switch a transfer destination of the data by the transfer unit on a basis of the abnormality information received by the receiving unit.

The object and advantages of the invention will be realized and attained at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 3A illustrates operation-1 at the time of detection of an abnormality by a relay apparatus.
FIG. 3B illustrates operation-2 at the time of detection of an abnormality by a relay apparatus.
FIG. 16 illustrates an example of information stored by each of the relay apparatuses in the state shown in FIG. 4.
FIG. 17 illustrates an example of information stored by each of the relay apparatuses in the state shown in FIG. 7.

DESCRIPTION OF EMBODIMENTS

By the above-described related-art technique, there is a problem in that reliability of the communication quality cannot be improved. For example, there are cases where an abnormality detected by a relay router is notified, as a quality report, to a server, maintenance personnel, etc., which consolidates management of individual relay routers. In these cases, the server, the maintenance personnel, etc., identify an abnormality location, and thus the server and the maintenance personnel separate the abnormality location and establish a new communication path by central control. Accordingly, it takes time to separate the abnormality location and to establish the new communication path, and thus it is not possible to improve reliability of the communication quality.

In the following, detailed descriptions will be given of embodiments of the disclosed relay apparatus, relay method and communication system with reference to the accompanying drawings.

Figure 1:
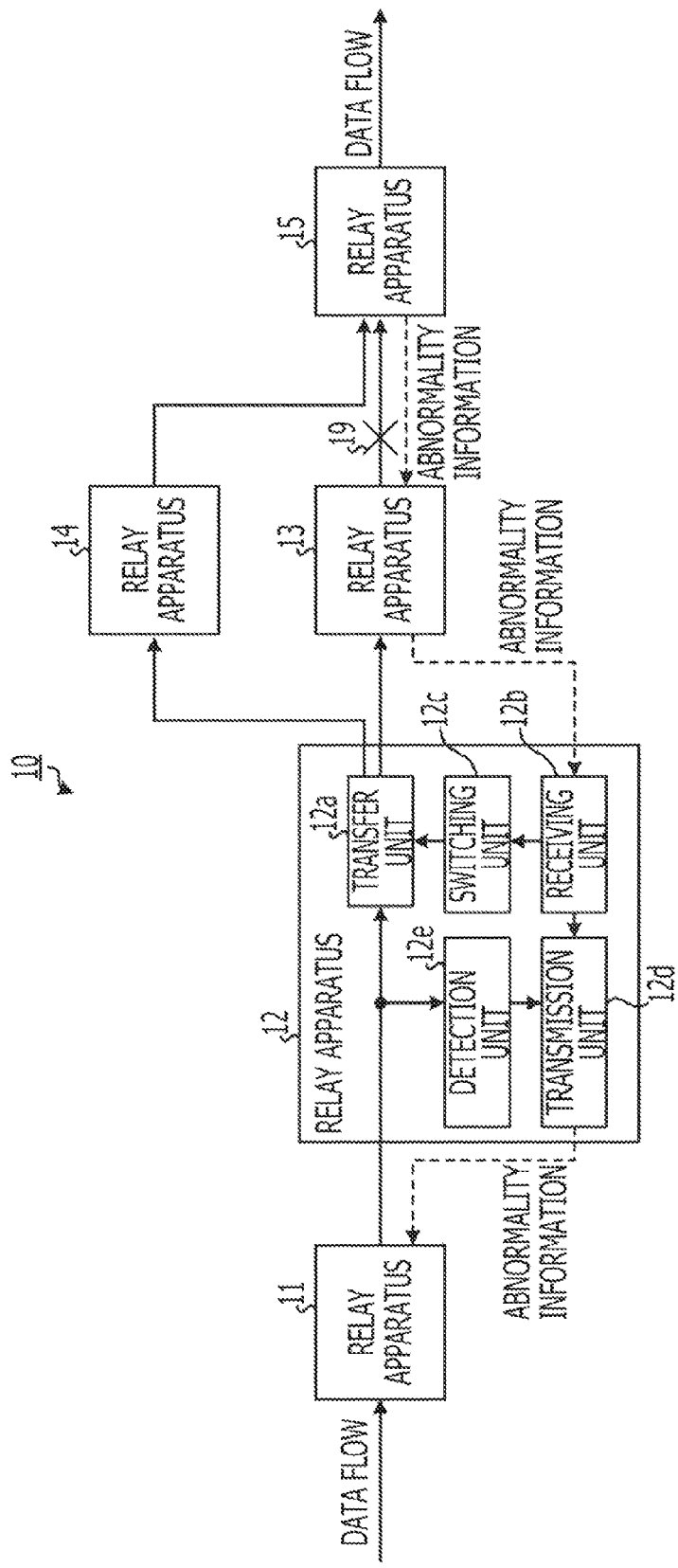
FIG. 1 illustrates a configuration of a communication system according to an embodiment.

FIG. 1 is a diagram illustrating a configuration of a communication system according to an embodiment. The communication system 10 includes relay apparatuses 11 to 15. The communication system 10 is a communication system which, for example, transfers data flow (data) transmitted from a preceding-stage communication apparatus (not shown in the figure) of the relay apparatus 11 to the relay apparatuses 11 to 15, and transmits the data flow to a subsequent-stage communication apparatus (not shown in the figure) of the relay apparatus 15.

The relay apparatuses 11 to 15 form a redundant path for transferring the data flow. For example, it is possible to transfer the data flow through a route going through the relay apparatus 11, the relay apparatus 12, the relay apparatus 13, and the relay apparatus 15 in this order. Also, it is possible to transfer the data flow through a route going through the relay apparatus 11, the relay apparatus 12, the relay apparatus 14, and the relay apparatus 15 in this order.

Here, for the individual relay apparatuses 11 to 15, a transmission-source communication apparatus which transmits the data flow to its own apparatus is called a preceding-stage communication apparatus, and a transmission-destination communication apparatus to which its own apparatus transmits the data flow is called a subsequent-stage communication apparatus. For example, for the relay apparatus 12, the relay apparatus 11 is a preceding-stage communication apparatus, and the relay apparatus 13 and the relay apparatus 14 are subsequent-stage communication apparatuses.

Each of the relay apparatuses 11 to 15 transfers the data flow from a preceding-stage communication apparatus to a subsequent-stage communication apparatus. For example, the relay apparatus 11 transfers the data flow from the preceding-stage communication apparatus (not shown in the figure) to the subsequent-stage relay apparatus 12. The relay apparatus 12 transfers the data flow from the preceding-stage relay apparatus 11 to the subsequent-stage relay apparatus 13 or relay apparatus 14.

The relay apparatus 13 transfers the data flow from the preceding-stage relay apparatus 12 to the subsequent-stage relay apparatus 15. The relay apparatus 14 transfers the data flow from the preceding-stage relay apparatus 12 to the subsequent-stage relay apparatus 15. The relay apparatus 15 transfers the data flow from the preceding-stage relay apparatus 13 or relay apparatus 14 to the subsequent-stage communication apparatus (not shown in the figure).

Thereby, it is possible to transmit the data flow transmitted from the preceding-stage communication apparatus (not shown in the figure) of the relay apparatus 11 by the relay apparatuses 11 to 15, and to transmit the data flow to the subsequent-stage communication apparatus of the relay apparatus 15. Next, a description will be given of a specific configuration of the relay apparatus 12. The relay apparatus 12 includes a transfer unit 12a, a receiving unit 12b, a switching unit 12c, a transmission unit 12d, and a detection unit 12e.

The transfer unit 12a transfers the data flow from the preceding-stage communication apparatus (the relay apparatus 11) to the subsequent-stage communication apparatus (the relay apparatus 13 or the relay apparatus 14). In the initial state, the transfer unit 12a is assumed to transfer the data flow from the relay apparatus 11 to the relay apparatus 13. In this regard, the transfer destination of the data flow by the transfer unit 12a may be switched to either the relay apparatus 14 or the relay apparatus 13 by the switching unit 12c.

The receiving unit 12b receives abnormality information indicating an abnormality of the data flow transferred by the transfer unit 12a from the subsequent-stage communication apparatus (the relay apparatus 13 in the example in FIG. 1). The abnormality of the data flow transferred by the transfer unit 12a includes, for example, an abnormality that occurred while the data flow is transferred from the relay apparatus 12 to the relay apparatus 13, and an abnormality that occurred while the data flow is transferred from relay apparatus 13 to the relay apparatus 15, etc.

The abnormality information includes, for example, information indicating a communication apparatus in which an abnormality has been detected, and information indicating whether there is a detour path making a detour around an abnormality occurrence location, etc., through the subsequent-stage communication apparatus. The receiving unit 12b outputs the received abnormality information to the switching unit 12c and the transmission unit 12d.

The switching unit 12c keeps the data-flow transfer destination of the transfer unit 12a directed to the relay apparatus 13, or switches the transfer destination to a communication apparatus different from the relay apparatus 13 on the basis of the abnormality information output from the receiving unit 12b. For example, if the abnormality information includes information indicating that there is a detour path making a detour around the abnormality occurrence location through the relay apparatus 13, which is a subsequent relay apparatus, the switching unit 12c does not switch the data-flow transfer destination, and keeps the data-flow transfer destination directed to the relay apparatus 13 without change. On the other hand, if there is no detour path making a detour around the abnormality occurrence location through the relay apparatus 13, the switching unit 12c switches the data-flow transfer destination from the relay apparatus 13 to the relay apparatus 14.

The transmission unit 12d transmits the abnormality information output from the receiving unit 12b to the preceding-stage communication apparatus (the relay apparatus 11). Also, the transmission unit 12d transmits the abnormality information output from the detection unit 12e to the preceding-stage communication apparatus (the relay apparatus 11). For example, the transmission unit 12d transmits abnormality information including information indicating whether there is a detour path making a detour around the subsequent-stage communication apparatus (the relay apparatus 13) through its own apparatus or not.

The detection unit 12e detects an abnormality of the data flow from the preceding-stage communication apparatus (the relay apparatus 11). The detection unit 12e outputs the abnormality information indicating the detected abnormality to the transmission unit 12d. The abnormality information output by the detection unit 12e is, for example, information (IP address, etc.) indicating the communication apparatus (the relay apparatus 12) in which the abnormality has been detected.

In the present embodiment, it is assumed that the relay apparatuses 11 and 13 to 15 have substantially the same configuration as that the relay apparatus 12. Here, it is assumed that an abnormality 19 of a data flow has occurred between the relay apparatus 13 and the relay apparatus 15. In this case, the abnormality 19 is detected by the detection unit 12e of the relay apparatus 15. And abnormality information indicating the relay apparatus 15 that has detected the abnormality 19 is transmitted to the relay apparatus 13.

Since the relay apparatus 15 that has detected the abnormality 19 is the subsequent-stage communication apparatus, the relay apparatus 13 recognizes that its own apparatus is included in the occurrence location (between the relay apparatus 13 and the relay apparatus 15) of the abnormality 19 on the basis of the abnormality information from the relay apparatus 15. In this case, the relay apparatus 13 determines whether there is a detour path making a detour around the occurrence location of the abnormality 19 through the relay apparatus 13, and transmits the abnormality information including information indicating the determination result to the relay apparatus 12. Here, there is no detour path making a detour around the occurrence location of the abnormality 19 through the relay apparatus 13, and thus abnormality information including information indicating "no detour path from the relay apparatus 13" is transmitted from the relay apparatus 13 to the relay apparatus 12.

Since the relay apparatus 15 that has detected the abnormality 19 is not the subsequent-stage communication apparatus (immediately after communication apparatus), the relay apparatus 12 recognizes that its own apparatus is not included in the occurrence location of the abnormality 19 on the basis of the abnormality information from the relay apparatus 13. That is to say, the relay apparatus 12 determines that the abnormality is not an abnormality that occurred between its own apparatus and the immediately after communication apparatus of its own apparatus. And, the abnormality information from the relay apparatus 13 indicates "no detour path from the relay apparatus 13", and thus the switching unit 12*c* switches the transfer destination of the data flow from the transfer unit 12*a* of the relay apparatus 13 to the relay apparatus 14. Thereby, the data flow is transferred from the relay apparatus 12 to the relay apparatus 14, and is transferred from the relay apparatus 14 to the relay apparatus 15. Also, the transmission unit 12*d* transmits the abnormality information indicating the abnormality 19 to the relay apparatus 11, which is the preceding-stage relay apparatus.

In this manner, the relay apparatuses 11 to 15 receive abnormality information indicating an abnormality of the transferred data flow from the subsequent-stage communication apparatus in the data-flow transfer direction, and switch the transfer destination of the data flow on the basis of the received abnormality information. Thereby, if an error occurs in the data-flow transfer destination, the data-flow transfer path may be changed autonomously. Accordingly, it is possible to redress an abnormality of the data flow in a short time.

For example, if there is no detour path making a detour around an abnormality occurrence location through a subsequent-stage communication apparatus, the relay apparatuses 11 to 15 switch the data-flow transfer destination on the basis of the received abnormality information. And if there is a detour path, the relay apparatuses 11 to 15 do not switch the data-flow transfer destination. Thereby, by a minimum route change, it is possible to establish a new transfer path making a detour around the abnormality occurrence location.

Also, the received abnormality information is transmitted to the preceding-stage communication apparatus to notify the occurrence of an abnormality to the preceding-stage communication apparatus so that it becomes possible for the preceding-stage communication apparatus to autonomously switch the transfer path of the data flow. Also, an abnormality of the data flow from the preceding-stage communication apparatus is detected so that the relay apparatus autonomously detects the abnormality of the data flow. Also, by transmitting abnormality information indicating the detected abnormality to the preceding-stage communication apparatus, it becomes possible for the preceding-stage communication apparatus to autonomously switch the transfer path of the data flow.

Also, if the communication apparatus that has detected an abnormality is the subsequent-stage communication apparatus, the relay apparatuses 11 to 15 transmit abnormality information indicating whether there is a detour path making a detour around the subsequent-stage communication apparatus through its own apparatus or not to the preceding-stage communication apparatus. Thereby, if its own apparatus is included in an abnormality occurrence location, it becomes possible for its own apparatus to notify whether there is a detour path making a detour around its own apparatus or not to the preceding-stage communication apparatus, and it becomes possible for the preceding-stage communication apparatus to autonomously determine whether to switch the transfer destination of the data flow or not.

The communication system 10 shown in FIG. 1 may be applied to a network provided with, for example, RSVP. In this case, each of the relay apparatuses 11 to 15 transmits and receives an RSVP message (control message) including a path message and a resource reservation message, and includes a processing unit conducting quality assurance of a communication path of a data flow using the RSVP message.

Also, the receiving unit 12*b* receives the abnormality information stored in the RSVP message transmitted from the relay apparatus 13. Also, the transmission unit 12*d* stores the abnormality information in an RSVP message, and transmits the RSVP message to the relay apparatus 11. In this manner, by storing the abnormality information indicating an abnormality of data flow in an RSVP message and transmitting and receiving the message, it is possible to transmit and receive the abnormality information indicating the abnormality of the data flow without adding a new standard.

Also, each of the relay apparatuses 11 to 15 may include a notification part in the transmission unit 12*d* on the basis of the abnormality information received by the receiving unit 12*b*. Information of the abnormality 19 to be notified to a user (for example, maintenance personnel) may be, for example, information indicating that the abnormality 19 has occurred, or may be information indicating the occurrence location (between the relay apparatus 13 and the relay apparatus 15) of the abnormality 19, etc. Thereby, it is possible to notify the information of the abnormality 19 to maintenance personnel to prompt the maintenance personnel to inspect and replace a failure location while autonomously switching the transfer path of the data flow to redress the abnormality in a short time.

In this regard, a description has been given of a configuration in which the communication system 10 includes the relay apparatuses 11 to 15, but the configuration of the communication system 10 is not limited to such a configuration. Also, in place of the relay apparatus 11, a communication apparatus, such as a gateway, etc., which generates and transmits a data flow, may be provided. Also, in place of the relay apparatus 15, a communication apparatus, such as a gateway, etc., which receives a data flow, may be provided.

A description will be given of a notification of an abnormality using an RSVP message.

Figure 2:
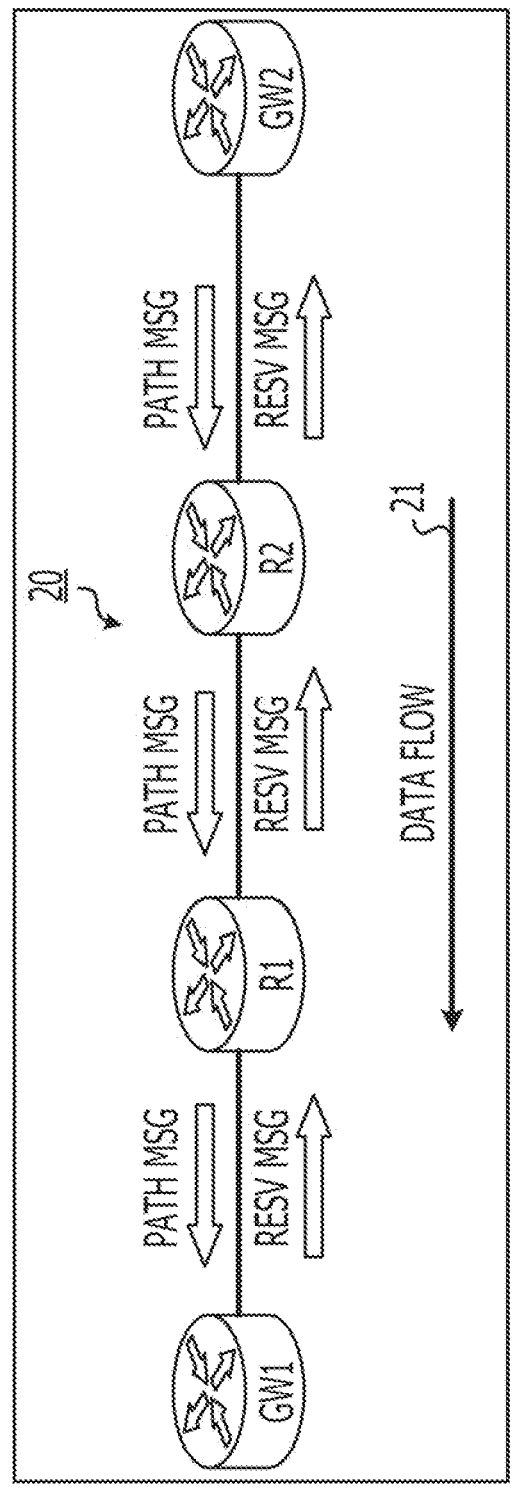
FIG. 2 illustrates transfer of RSVP messages.

FIG. 2 is a diagram illustrating an example of transfer of an RSVP message. As shown in FIG. 2, the communication system 20 includes gateways GW1 and GW2 and routers R1 and R2. As shown by an arrow 21, in the communication system 20, a data flow from the gateway GW2 is transferred to in the order of the router R2 and the router R1, and to the gateway GW1. For example, the relay apparatus 12 shown in FIG. 1 may be applied to each of the routers R1 and R2.

Also, in the communication system 20, quality assurance of a communication path of a data flow is carried out using RSVP. Specifically, the gateway GW2 periodically transmits a path message (Path Msg) as a refresh message during transmission of a data flow. The path message transmitted by the gateway GW2 is transferred to the router R2 and the router R1 in this order, and to the gateway GW1.

When the routers R1 and R2 transfer a path message, the routers R1 and R2 ensure a path for transferring a resource reservation message from the gateway GW1 against the path message to the gateway GW2. The path for transferring a resource reservation message to the gateway GW2 is a reverse path of the path of the path message.

The gateway GW1 that has received the path message from the gateway GW2 transmits a resource reservation message (Resv Msg) against the path message. The resource reservation message transmitted by the gateway GW1 is transferred to the router R1, the router R2 in this order, and to the gateway GW2. When the routers R1 and R2 transfer the resource reservation message, the routers R1 and R2 ensure resources for transferring the data flow from the gateway GW2 to the gateway GW1.

Thereby, using the path ensured by the path message and the resources ensured by the resource reservation message, the data flow from the gateway GW2 is transferred to the gateway GW1 in a state in which the communication-path quality is ensured. Here, a description has been given to the RSVP message transmitted as a refresh message, but the same description will be given to an RSVP message to be transmitted for an initial setting before transmission of a data flow.

In the state shown in FIG. 2, it is assumed that the detection unit 12e of the router R1 has detected an abnormality of data flow transferred from the router R2 (for example, detected disconnection). Next, a description will be given of operation of the router R1 at the time of detection of an abnormality (refer to FIG. 3A and FIG. 3B). In this regard, the router R1 and the router R2 are assumed to have the same configuration as the relay apparatus 12 described above.

FIG. 3A illustrates operation-1 at the time of detection of an abnormality by a relay apparatus. When the router R1 that has detected an abnormality of a data flow receives a path message from the router R2, the router R1 transmits the abnormality information indicating the detected data-flow abnormality to the router R2. Specifically, as shown in FIG. 3A, the router R1 stores the abnormality information in the path error message (Err Msg) against the received path message, and returns the path error message to the router R2. Further, the router R1 may notify the abnormality information indicating the abnormality of the data flow to the maintenance personnel of the router R1. Thereby, the maintenance personnel of the router R1 learns of the abnormality occurrence of the data flow.

The router R2 recognizes that an abnormality of data flow has occurred between the router R2 and the router R1 by the abnormality information stored in the path error message returned from the router R1. The router R2 transfers the path error message returned from the router R1 to the gateway GW2. Further, the router R2 may notify the abnormality information indicating the abnormality of the data flow to maintenance personnel of the router R2. Thereby, the maintenance personnel of the router R2 learns of the abnormality occurrence of the data flow.

The gateway GW2 recognizes that an abnormality of data flow has occurred between the router R2 and the router R1 by the abnormality information stored in the path error message returned from the router R2. The gateway GW2 may notify the abnormality information indicating the abnormality of data flow to the maintenance personnel of the gateway GW2. Thereby, the maintenance personnel of the gateway GW2 learns of the abnormality occurrence of the data flow.

FIG. 3B illustrates operation-2 at the time of detection of an abnormality by a relay apparatus. When the router R1 that has detected an abnormality of a data flow receives the resource reservation message from the gateway GW1, the router R1 transmits the abnormality information to the gateway GW1. Specifically, as shown in FIG. 3B, the router R1 stores abnormality information in a resource-reservation error message (Err Msg) against the received resource reservation message, and returns the resource-reservation message to the gateway GW1.

The gateway GW1 recognizes that an abnormality of a data flow has occurred between the router R2 and the router R1 by the abnormality information stored in the resource-reservation error message returned from the router R1. The gateway GW1 may notify the abnormality information indicating the abnormality of the data flow to the maintenance personnel of the gateway GW1. Thereby, the maintenance personnel of the gateway GW1 learns of the abnormality occurrence of the data flow.

As shown in FIG. 3A and FIG. 3B, if an abnormality of a data flow is detected, the abnormality information indicating the detected abnormality is stored in an RSVP error message and transmitted so that it is possible to notify the abnormality of the data flow to the preceding-stage and the subsequent-stage communication apparatuses. Thereby, each of the communication apparatuses recognizes the abnormality of the data flow without transmitting and receiving a new signal for notifying the abnormality of the data flow. Accordingly, it becomes possible to autonomously establish a new transfer path by each of the relay apparatuses, and to notify the abnormality of the data flow to each of the relay apparatuses.

A description will be given of autonomous path switching.

Figure 4:
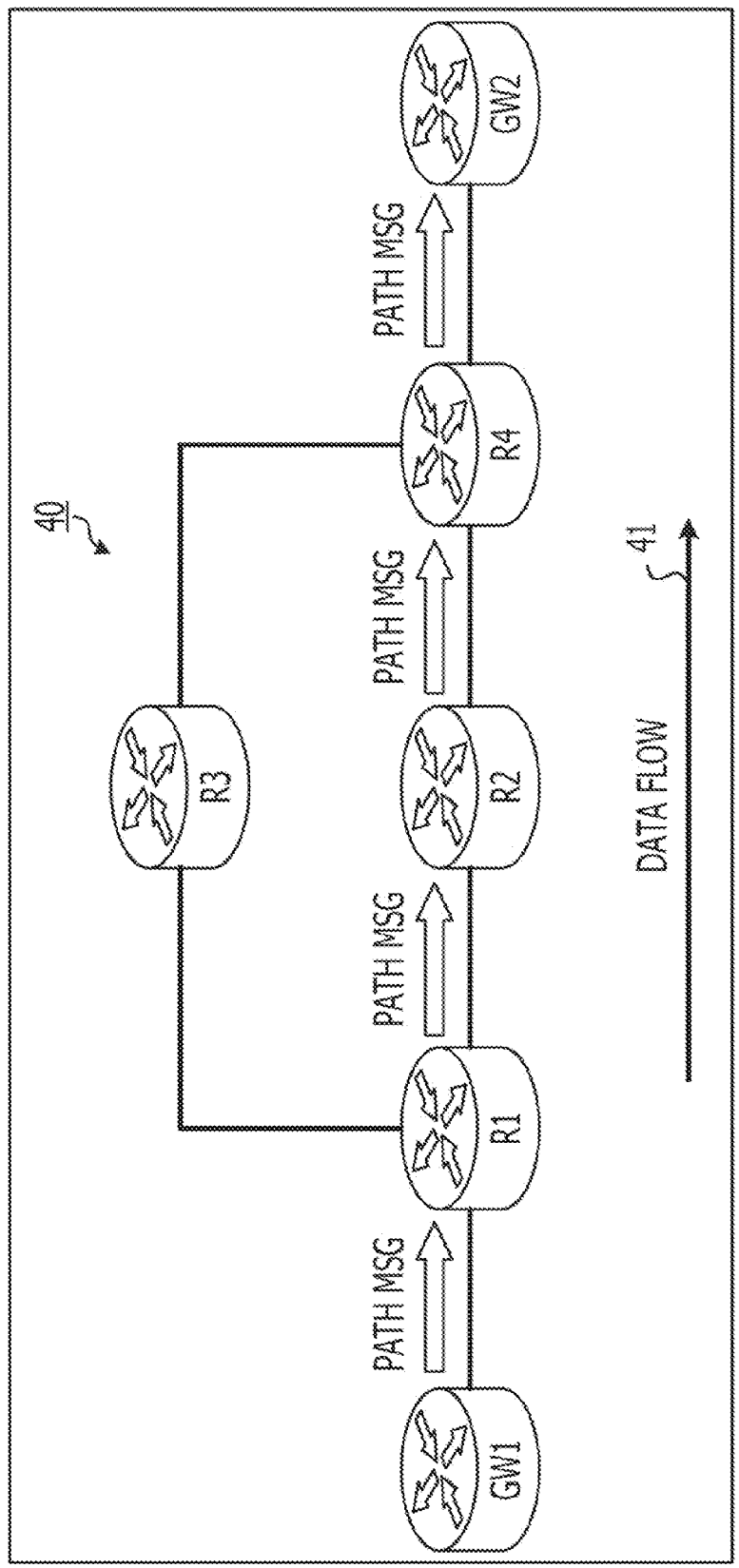
FIG. 4 illustrates transfer of path messages.

FIG. 4 is a diagram illustrating transfer of a path message. As shown in FIG. 4, a communication system 40 includes gateways GW1 and GW2, and routers R1 to R4. For example, the relay apparatus 12 shown in FIG. 1 may be applied to each of the routers R1 to R4. As shown by an arrow 41, in the communication system 40, a data flow is transferred from the gateway GW1 to the gateway GW2. Also, an RSVP resource is reserved in a path going through in the order of the gateway GW1, the router R1, the router R2, the router R4, and the gateway GW2.

The gateway GW1 transmits a data flow having the gateway GW2 as a destination. Also, the gateway GW1 periodically transmits a path message (Path Msg) having the gateway GW2 as a destination as a refresh message. When each of the routers R1, R2, and R4 receives the data flow from the gateway GW1 from the preceding-stage communication apparatus, each of the routers R1, R2, and R4 transfers the received data flow to the subsequent-stage communication apparatus.

And each of the routers R1, R2, and R4 transfers the path message (path Msg) from the gateway GW1 along the path through which the data flow is transmitted. The path through which the data flow is transmitted is, for example, a route of unicast/multicast obtained by the routing. The gateway GW2 receives a path message transmitted from the gateway GW1, and transferred by the routers R1, R2, and R4. Thereby, the gateway GW2 that receives the data flow may transmit a resource reservation message (Resv Msg) along a correct path (a reverse path of the path message).

The routers R1, R2, and R4 that have received a path message create a table of path information inside, and hold the table. The path information includes, for example, an IP address of the next hop/previous hop (node through which the message has past last) for transferring a resource reservation message through a reverse path of the path message. And each time a path message hops and is relayed, the IP address of the next hop/the previous hop is changed.

The information included in the path message is, for example, session information, the next hop/the previous hop information, refresh interval information, transmission-source host information, transmission-source host traffic specification information, policy information, etc. The routers R1, R2, and R4 that exist on a path through which the path message is transmitted temporarily store the path information in accordance with the received path message. In order for the routers R1, R2, and R4 to maintain the path information, the gateway GW1 periodically transmits path messages.

If an error occurs in the processing when a path message is received, each of the routers R1, R2, and R4 stores error contents in error notification information of a path-error message, and transmits the path message to the transmission source. The path error message in which error contents are stored is transferred to the gateway GW1 by hop-by-hop of each of the routers.

Figure 5:
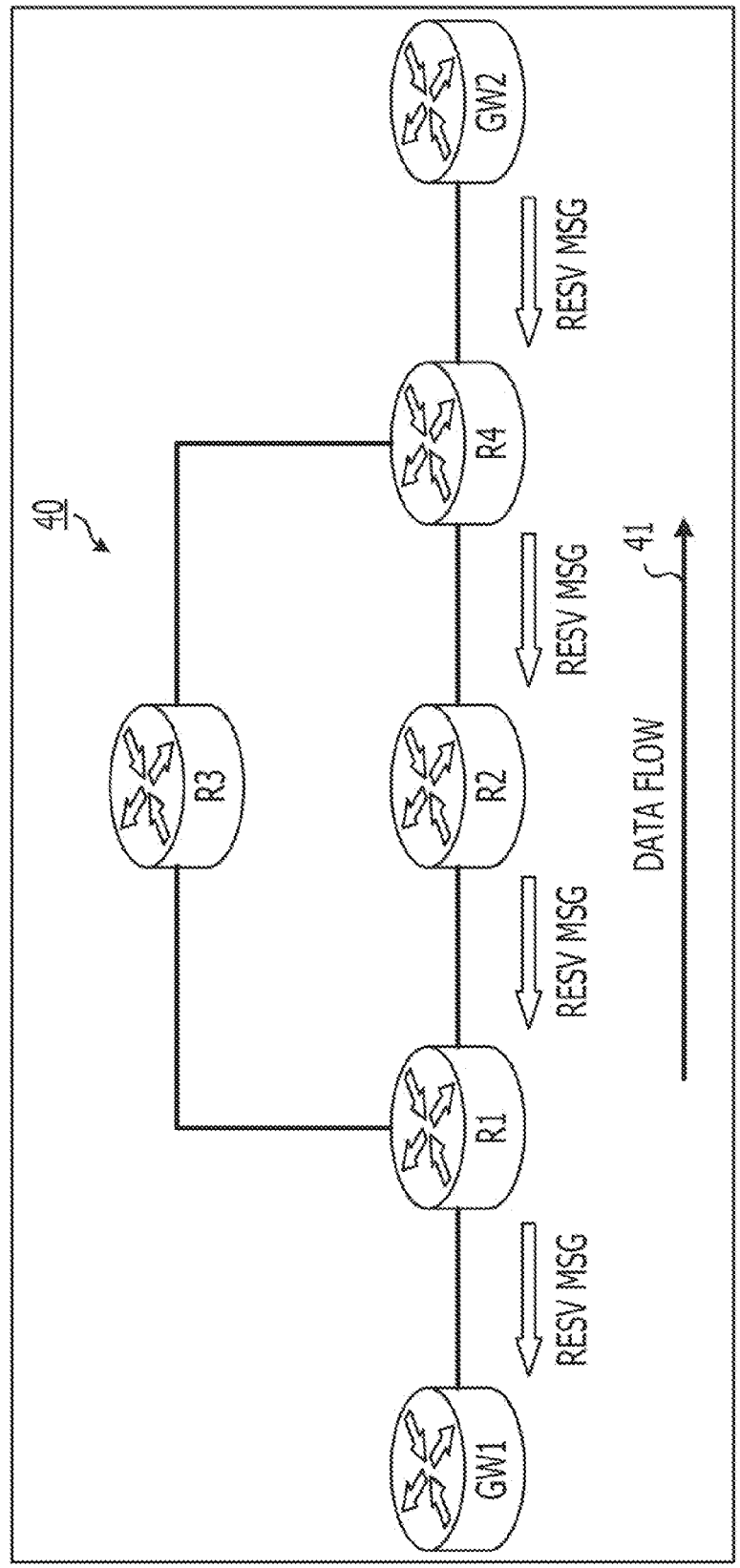
FIG. 5 illustrates transfer of resource reservation messages.

FIG. 5 is a diagram illustrating transfer of a resource reservation message. The gateway GW2 that has received a path message transmits a resource reservation message (Resv Msg) along a reverse path of the path through which the path message passed. Accordingly, the resource reservation message from the gateway GW2 is transmitted to the gateway GW1 through the routers R4, R2, and R1. Each of the routers R4, R2, and R1 creates a table for resource reservation information inside on the basis of the resource reservation message passing therethrough, and maintains the table.

In the substantially same manner as a path message, the resource reservation message includes an IP address of the next hop/the previous hop (node through which the message has past last) for transferring a resource reservation message through the reverse path. And each time a resource reservation message hops and is relayed, the IP address of the next hop/the previous hop is changed.

The information included in the resource reservation message is, for example, session information, next hop/previous hop information, refresh interval information, resource-reservation method information, flow specification information, filter specification information, etc. The routers R1, R2, and R4 that exist on a path through which a resource reservation message is transmitted temporarily stores the resource reservation information in accordance with the received resource reservation message. In order for the routers R1, R2, and R4 to maintain the resource reservation information, the gateway GW2 periodically transmits resource reservation messages.

In order to provide a QoS (Quality of Service) function, the routers R1 to R4 that have implemented RSVP perform traffic control, such as classify, policy control, a scheduler. When each of the routers R1 to R4 receives a resource reservation message, each of the routers R1 to R4 checks whether it is possible to supply sufficient resources to the requested QoS or not. As a result, if resources are determined available, the processing proceeds to classify and scheduler processing. If resources are determined not available, a resource-reservation error message is returned to a transmission source that has requested the resource reservation.

Figure 6:
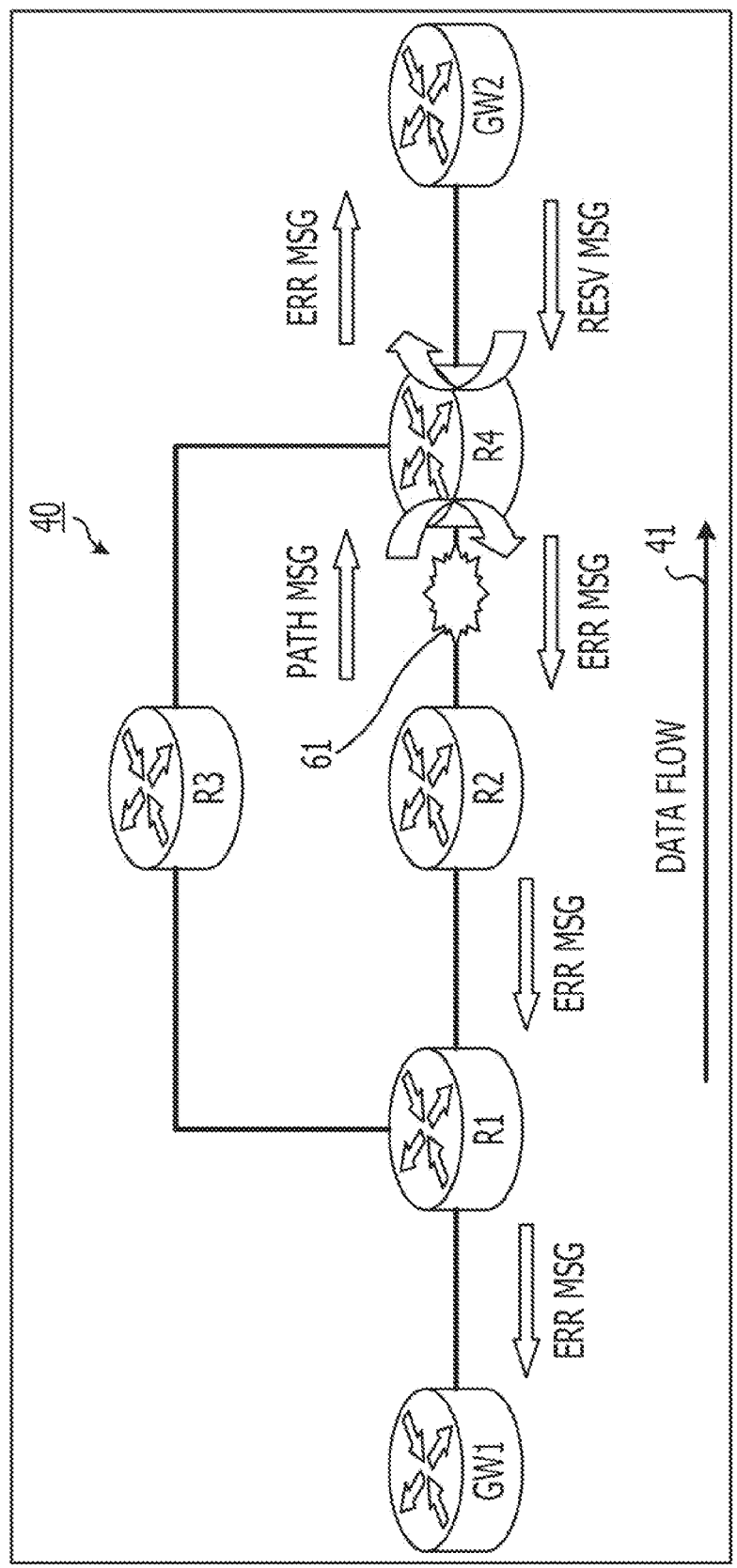
FIG. 6 illustrates identification of an abnormality occurrence location and deletion of a resource.

FIG. 6 is a diagram illustrating identification of an abnormality occurrence location and deletion of a resource. In the communication system 40 shown in FIG. 4 and FIG. 5, it is assumed that an abnormality 61 of a data flow occurs between the router R2 and the router R4. In this case, the abnormality 61 is detected by the router R4.

When the router R4 detects the abnormality 61, the router R4 stores the abnormality information indicating the abnormality 61 in a resource-reservation error message against a resource reservation message (Resv Msg) received from the gateway GW2. And the router R4 returns the resource-reservation error message (Err Msg) including the abnormality information to the gateway GW2.

Also, when the router R4 detects the abnormality 61, the router R4 stores the abnormality information indicating the abnormality 61 in a path error message against a path message (Path Msg) received from the router R2. And the router R4 returns the path error message (Err Msg) including the abnormality information to the router R2.

The router R2 recognizes the abnormality 61 on the basis of the abnormality information stored in the path error message from the router R4. Also, the router R2 determines that its own apparatus is included in the occurrence location of the abnormality 61 on the basis of the abnormality information. Also, the router R2 has no detour path making a detour around the occurrence location (between the router R2 and the router R4) of the abnormality 61 through the router R2, and thus the router R2 stores the abnormality information indicating "no detour path from the router R2" in the path error message. And the router R2 transfers the path error message including the abnormality information to the router R1.

The router R1 recognizes the abnormality 61 on the basis of the abnormality information stored in the path error message from the router R2, and obtains information of "no detour path from the router R2". On the other hand, the router R1 excludes the router R4 from candidates of a transfer destination of the data flow. The router R1 transfers the path error message to the gateway GW1. Thereby, the resources of a path going through in the order of the router R1, the router R2, and the router R4 are deleted.

Figure 7:
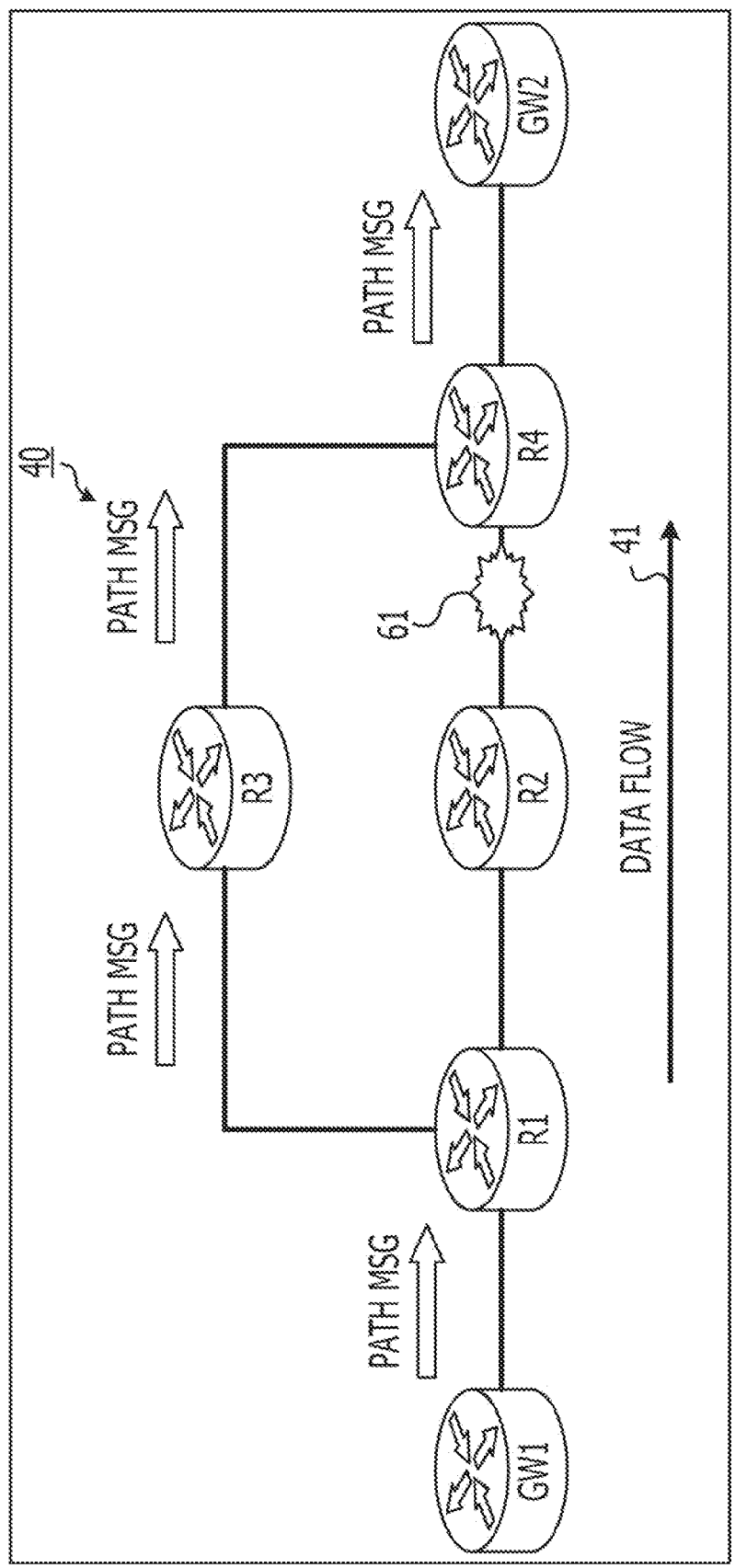
FIG. 7 illustrates establishment of a detour path making a detour around an abnormality occurrence location.

FIG. 7 is a diagram illustrating establishment of a detour path making a detour around an abnormality occurrence location. The routers R2 and R3 are connected to the router R1 as the subsequent-stage communication apparatuses. Accordingly, when the router R1 receives a data flow from the gateway GW1, the router R1 selects either the routers R2 or R3 as a data-flow transfer destination. Here, the router R2 has been excluded from transfer destinations of the router R1, and thus the router R1 selects the router R3 as the data-flow transfer destination. And the router R1 transfers the data flow from the gateway GW1 to the router R3.

Thereby, a new path going through in the order of the router R1, the router R3, and the router R4 is established. The newly established path is a detour path making a detour around the occurrence location (between the router R2 and the router R4) of the abnormality 61. Also, the router R1 transfers the path message from the gateway GW1 to the router R3. Thereby, the path message from the gateway GW1 is also transferred to the gateway GW2 through the newly established detour path. Accordingly, the gateway GW2 transfers the resource reservation message through a reverse path (in the order of the routers R4, R3, and R1, and the gateway GW1) of the newly established detour path.

A description will be given of an example of functional configuration of a relay apparatus.

Figure 8:
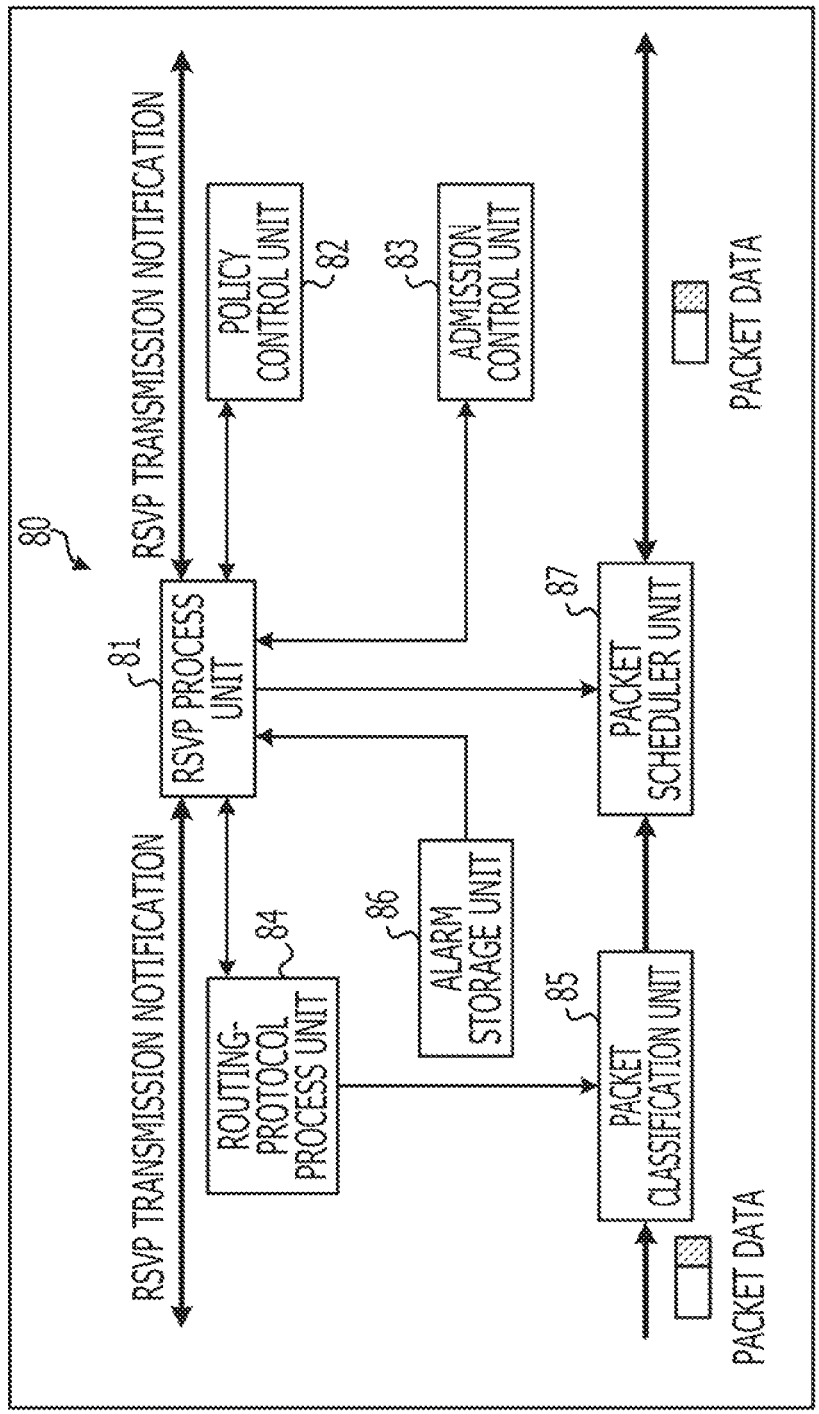
FIG. 8 illustrates an example of a functional configuration of a relay apparatus.

FIG. 8 is a diagram illustrating an example of a functional configuration of the relay apparatus. The relay apparatus 80 shown in FIG. 8 may be applied to, for example, the routers R1 to R4 shown in FIG. 4 to FIG. 7. The relay apparatus 80 includes an RSVP process unit 81, a policy control unit 82, an admission control unit 83, a routing protocol process unit 84, a packet classification unit 85, an alarm storage unit 86, and a packet scheduler unit 87.

The RSVP process unit 81 is a processing unit which transmits and receives a control message (RSVP transmission notification) between the preceding-stage communication apparatus and the subsequent-stage communication apparatus, and carries out quality assurance of a communication path of a data flow using a transmitted and received control message. The control message is an RSVP control message, and specifically, includes a path message, a resource reservation message, a path error message, and a resource-reservation error message, etc.

When the RSVP process unit 81 receives a resource reservation message, the packet classification unit 85, the admission control unit 83, the policy control unit 82, and the packet scheduler unit 87 perform traffic control for providing the QoS function. The policy control unit 82 performs policy control on a RSVP process of the RSVP process unit 81. The admission control unit 83 performs admission control on the RSVP process in the RSVP process unit 81.

The routing protocol process unit 84 controls routing of a data packet in the packet classification unit 85 on the basis of the RSVP process by the RSVP process unit 81. For example, the routing protocol process unit 84 obtains an extraction condition of an RSVP target packet from the resource reservation message transmitted and received by the RSVP process unit 81, and outputs the obtained extraction condition to the packet classification unit 85.

The packet classification unit 85 receives packet data from the preceding-stage communication apparatus. And the packet classification unit 85 obtains a header (IP address, port number, etc.) of a received packet data, and classifies the packet data on the basis of the obtained header. For example, the packet classification unit 85 extracts an RSVP target packet (data flow) using an extraction condition of the RSVP target packet output from the routing protocol process unit 84. The packet classification unit 85 outputs the classified packet data to the packet scheduler unit 87.

The packet scheduler unit 87 performs scheduling of the packet data output from the packet classification unit 85, and transmits the packet data to the subsequent-stage communication apparatus on the basis of the scheduling result. The packet scheduler unit 87 performs scheduling, for example, on the packet data classified by the packet classification unit 85 as the RSVP target packet in accordance with the RSVP process by the RSVP process unit 81.

A description will be given of an example of implementation of the transfer unit.

The transfer unit 12*a* shown in FIG. 1 is achieved by, for example, the packet classification unit 85 and the packet scheduler unit 87. The packet classification unit 85 and the packet scheduler unit 87 transfer packet data extracted using the extraction condition of the RSVP target packet out of the packet data from the preceding-stage communication apparatus as a data flow to the subsequent-stage communication apparatus.

A description will be given of an example of implementation of the detection unit.

The detection unit 12*e* shown in FIG. 1 is achieved by, for example, the packet classification unit 85. For example, the packet classification unit 85 is provided with a RTP/RTCP monitor function. Specifically, the packet classification unit 85 detects an abnormality of the packet data classified into RSVP target packets. For example, the packet classification unit 85 is provided with a timer which monitors time from the previous reception of an RSVP target packet, and if time monitored by the timer becomes a specified time or more, the packet classification unit 85 determines that an abnormality has occurred with the target packet.

If the packet classification unit 85 detects an abnormality of packet data, the packet classification unit 85 stores the alarm information into the alarm storage unit 86. The specified time period monitored by the timer is different depending on a network to be used, and thus may be varied. Also, the alarm information stored in the alarm storage unit 86 by the packet classification unit 85 may be cleared after a certain time period, or may be cleared by operation of the relay apparatus 80 by maintenance personnel.

A description will be given of an example of implementation of the receiving unit and the transmission unit.

The receiving unit 12*b* and the transmission unit 12*d* shown in FIG. 1 are achieved by, for example, the RSVP process unit 81. By the RSVP process unit 81, it is possible to store abnormality information in a path error message and a resource-reservation error message, and to transmit the messages. Also, by the RSVP process unit 81, it is possible to receive abnormality information stored in a path error message and a resource-reservation error message.

Also, the RSVP process unit 81 determines whether its own apparatus is included in the abnormality occurrence location on the basis of the abnormality information. Specifically, the RSVP process unit 81 compares the IP address of the communication apparatus in which the abnormality indicated by the abnormality information has been detected and the transmission-source IP address of the error message in which the abnormality information is stored.

If the compared IP addresses are the same, the RSVP process unit 81 determines that its own apparatus is included in the abnormality occurrence location. Also, if the compared IP addresses are different with each other, the RSVP process unit 81 determines that its own apparatus is not included in the abnormality occurrence location. For example, the router R2 determines that its own apparatus is included in the abnormality occurrence location. Also, the router R1 determines that its own apparatus is not included in the abnormality occurrence location.

If the RSVP process unit 81 determines that its own apparatus is included in the abnormality occurrence location, the RSVP process unit 81 determines whether there is a detour path making a detour around the abnormality occurrence location through its own apparatus. If determined that there is no detour path, the RSVP process unit 81 stores the abnormality information indicating that there is no detour path from its own apparatus in the error message.

A description will be given of an example of implementation of the switching unit.

The switching unit 12*c* shown in FIG. 1 is achieved by, for example, the routing protocol process unit 84. The routing protocol process unit 84 obtains and stores the abnormality information indicating that there is no detour path from a specified communication apparatus from the path error message transmitted and received by the RSVP process unit 81. And the routing protocol process unit 84 selects a transfer destination of the data flow on the basis of the stored abnormality information when the relay apparatus 80 transfers the data flow.

For example, the routing protocol process unit 84 of the router R1 stores the abnormality information indicating "no detour path from the router R2", which has been transmitted from the router R2. And the routing protocol process unit 84 of the router R1 excludes the router R2 from the transfer destinations at the time of transferring the data flow by the router R1 on the basis of the stored abnormality information indicating "no detour path from the router R2". The routing protocol process unit 84 controls the packet classification unit 85 so as to select the router R3, which is not excluded, as a transfer destination.

A description will be given of a specific example of an RSVP message.

Figure 9:
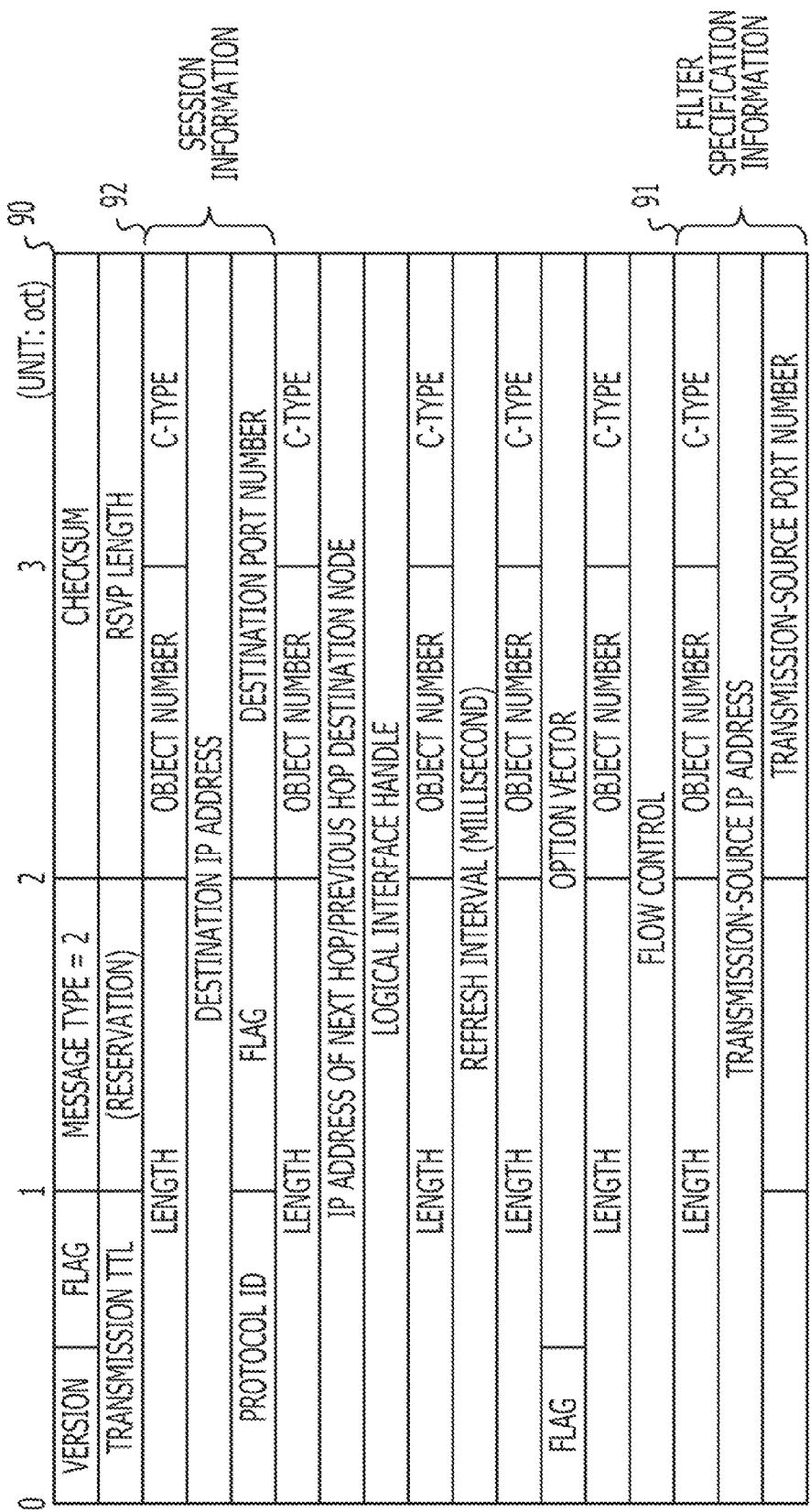
FIG. 9 illustrates a specific example of a resource reservation message.

FIG. 9 is a diagram illustrating a specific example of a resource reservation message. A resource reservation message 90 shown in FIG. 9 is an example of the resource reservation message transmitted and received by the RSVP process unit 81. The resource reservation message 90 includes filter specification information 91 to be an extraction condition of an RSVP target packet, and session information 92, etc.

The packet classification unit 85 obtains, for example, the filter specification information 91 and the session information 92, etc., as an extraction condition from the routing protocol process unit 84, and extracts an RSVP target packet from received packet data using the obtained extraction condition. However, the extraction condition of the RSVP target packet may be set freely by a user.

Figure 10:
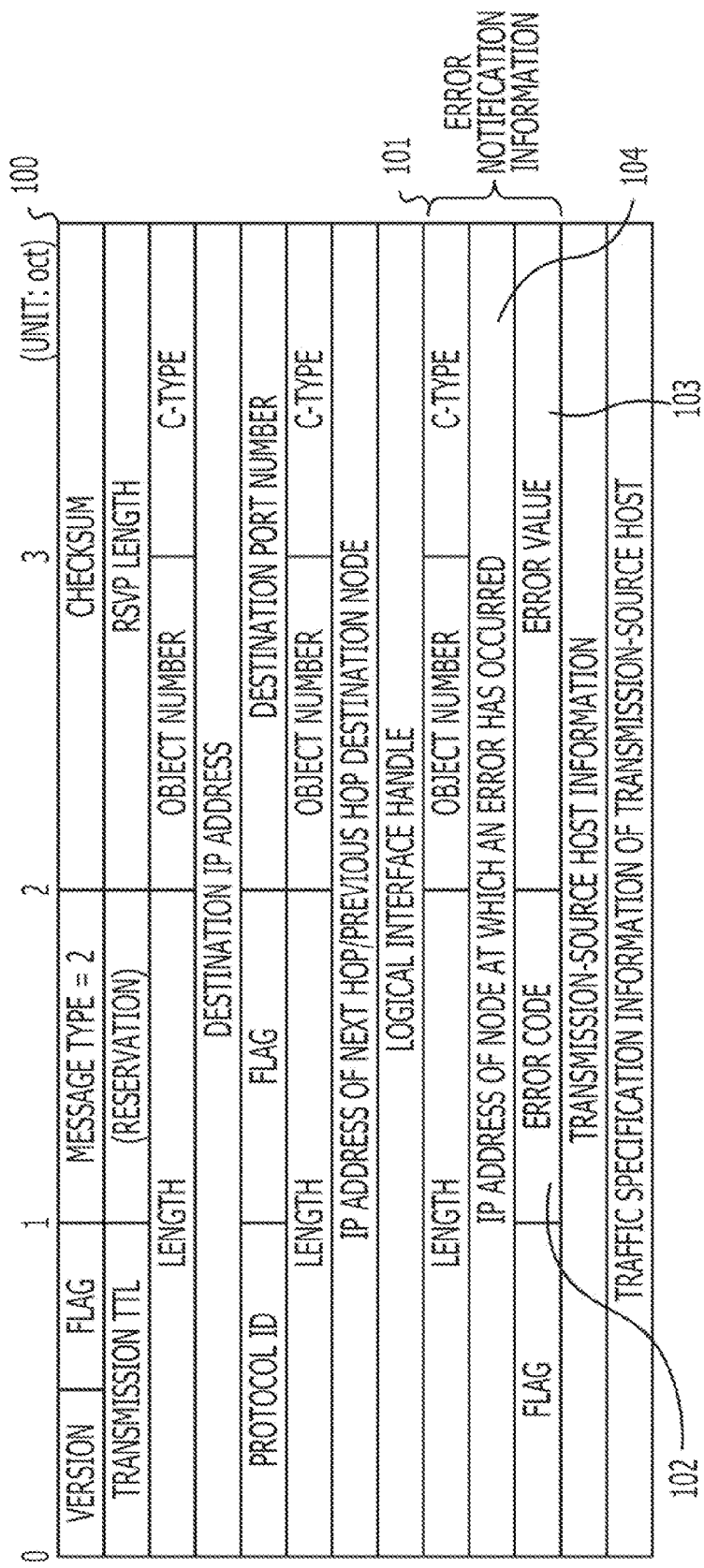
FIG. 10 illustrates a specific example of a path error message.

FIG. 10 is a diagram illustrating a specific example of a path error message. A path error message 100 shown in FIG. 10 is an example of a path error message transmitted and received by the RSVP process unit 81. The path error message 100 includes error notification information 101 storing the contents of an error that occurred during the transmission and the reception of path messages.

The error notification information 101 includes an error code 102. Here, a definition is given of "data flow abnormality" indicating the abnormality of the data flow detected by the packet classification unit 85 using an undefined value of the error code 102. The error code 102 is managed by, for example 8 bits, and currently has been defined up to 23 (0x17). Thus, for example, "error code=32 (0x20)" is defined as "data flow abnormality". Also, for example, in place of the error code 102, "data flow abnormality" may be defined using an error value 103 attached to the error code 102.

When the RSVP process unit 81 receives a path message, the RSVP process unit 81 refers to the alarm storage unit 86. And if alarm information is stored in the alarm storage unit 86, the RSVP process unit 81 stores the IP address of its own apparatus in "IP address of the node at which an error has occurred" denoted by code 104, and stores "error code=32" in the error code 102. And the RSVP process unit 81 returns a path error message 100 storing the IP address of its own apparatus and "error code=32" to the transmission source of the path message.

For example, the router R4 receives a path message from the router R2. If alarm information is stored in the alarm storage unit 86, the router R4 returns the path error message 100 storing the IP address of the router R4 and "error code=32" to the router R2. Thereby, it is possible for the routers R2 and R1 and the gateway GW1 to recognize an abnormality occurrence by "error code=32" stored in the path error message 100 from the router R4. Also, it is possible for the routers R2 and R1 and the gateway GW1 to identify an abnormality occurrence location by the IP address of the router R4 stored in the path error message 100.

Also, a definition is given of "no detour path" indicating that there is no detour path making a detour around an abnormality occurrence location through its own apparatus using an undefined value of the error code 102. For example, "error code=33 (0x21)" is defined as "no detour path". Also, for example, in place of the error code 102, "no detour path" may be defined using an error value 103 attached to the error code 102.

For example, since there is no detour path making a detour around an abnormality occurrence location (between the router R2 and the router R4) through the router R2, the router R2 transmits a path error message 100 having the error code 102 storing "error code=33" to the router R1. Since "error code=33" is stored in the path error message 100 received from the router R2, the router R1 recognizes that there is no detour path making a detour around an abnormality occurrence location through the router R2. On the other hand, the router R1 selects a transfer destination of data flow by excluding the router R2 (or with lowered priority).

Figure 11:
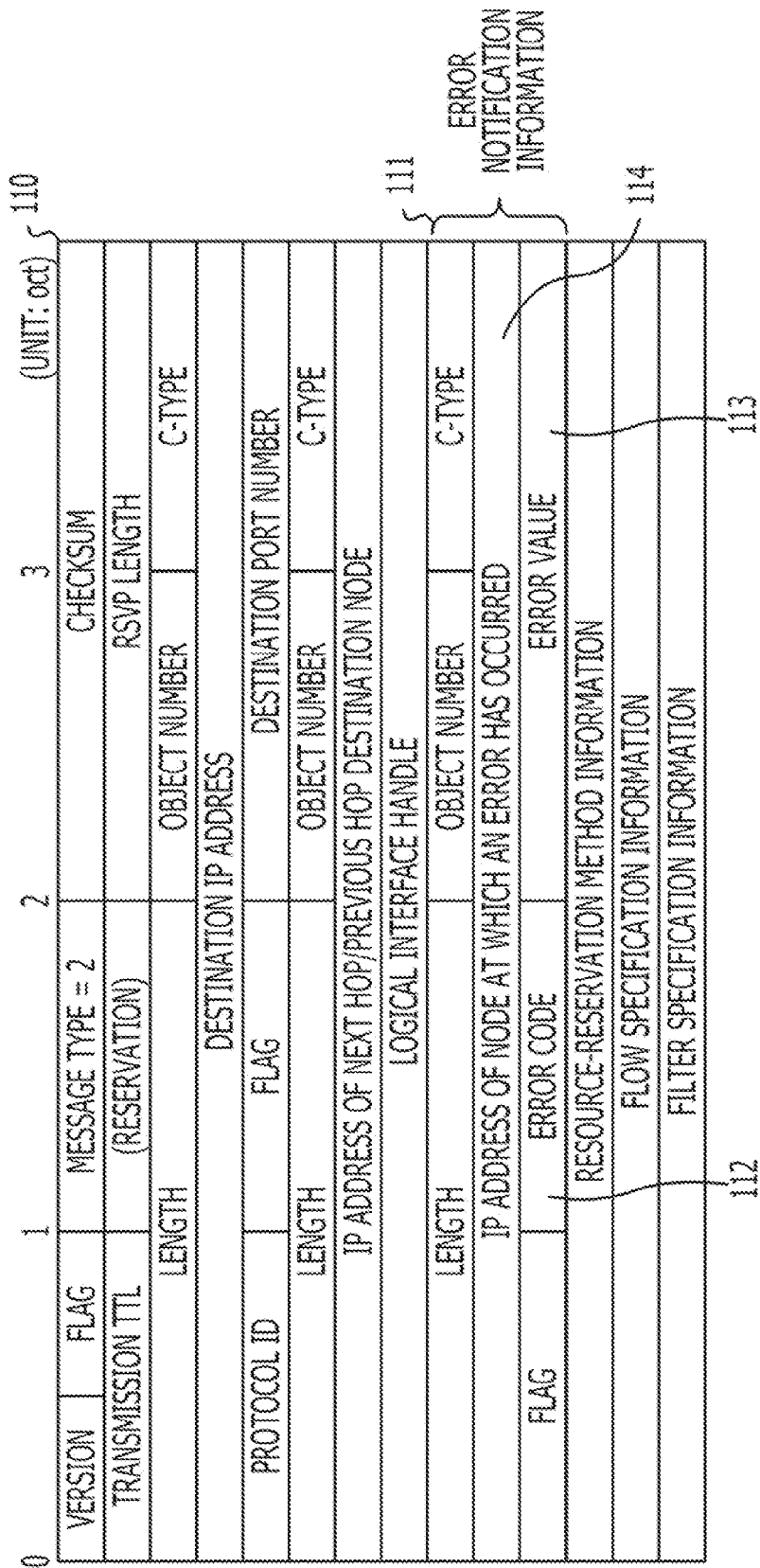
FIG. 11 illustrates a specific example of a resource-reservation error message.

FIG. 11 is a diagram illustrating a specific example of a resource-reservation error message. A resource-reservation error message 110 shown in FIG. 11 is an example of the resource-reservation error message transmitted and received by the RSVP process unit 81. The resource-reservation error message 110 includes error notification information 111 in which the contents of an error occurred during the transmission and the reception of the resource-reservation error message 110 are stored.

The error notification information 111 includes an error code 112. In substantially the same manner as the path error message 100, in the resource-reservation error message 110, "error code=32 (0x20)" is defined as a "data flow abnormality", and is stored in the error code 112. Also, "data flow abnormality" may be defined for the error value 113.

When the RSVP process unit 81 receives a resource reservation message 90, the RSVP process unit 81 refers to the alarm storage unit 86. And if alarm information is stored in the alarm storage unit 86, the RSVP process unit 81 stores the IP address of its own apparatus in the "IP address of the node at which an error occurred" denoted by a code 114, and stores "error code=32" in the error code 112. And the RSVP process unit 81 returns the resource-reservation error message 110 storing the IP address of its own apparatus and "error code=32" to the transmission source of the resource reservation message 90.

For example, the router R4 receives a resource reservation message 90 from the gateway GW2, and if alarm information is stored in the alarm storage unit 86, the router R4 returns the abnormality information storing the IP address of the router R4 and "error code=32" to the gateway GW2. Thereby, the gateway GW2 recognizes the abnormality occurrence by "error code=32" stored in the resource-reservation error message 110 from the router R4. Also, the gateway GW2 identifies the abnormality occurrence location by the IP address of the router R4 stored in the resource-reservation error message 110.

Also, a definition is given of "no detour path" indicating that there is no detour path making a detour around an abnormality occurrence location through its own apparatus using an undefined value of the error code 112. For example, "error code=33 (0x21)" is defined as "no detour path". Also, for example, in place of the error code 112, "no detour path" may be defined using an error value 113 attached to the error code 112.

A description will be given of an example of operation of the relay apparatus.

Figure 12:
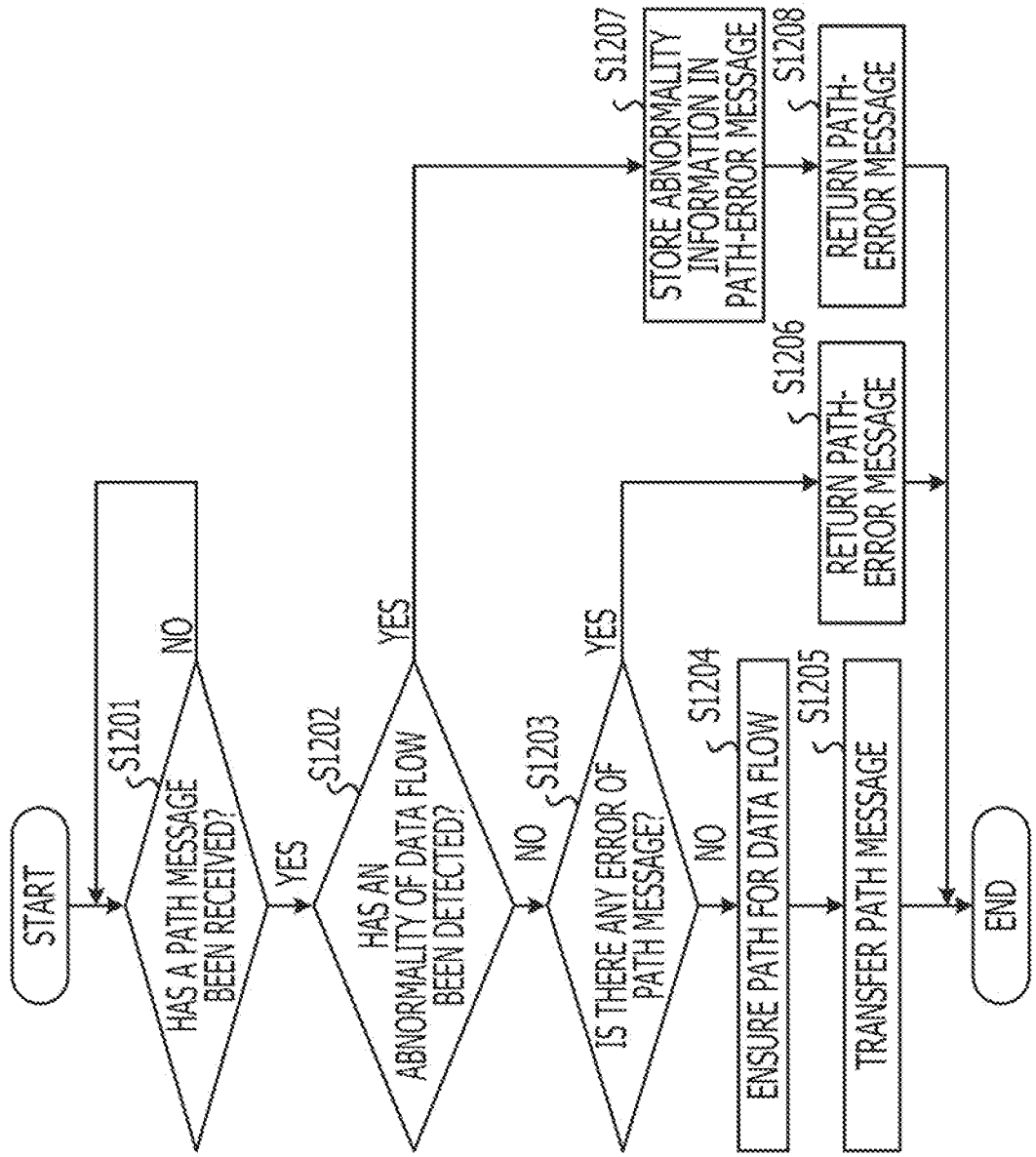
FIG. 12 is a flowchart illustrating an example of operation of a relay apparatus at the time of receiving a path message.

FIG. 12 is a flowchart illustrating an example of operation of the relay apparatus at the time of receiving a path message. First, each of the routers R1 to R4 determines whether a path message has been received or not from the preceding-stage communication apparatus (operation S1201), and waits for reception of a path message (operation S1201: a loop of No). If each of the routers receives a path message (operation S1201: Yes), each of the routers refers to the alarm storage unit 86 and determines whether each of the routers has detected an abnormality of a data flow (operation S1202).

In operation S1202, if each of the routers has not detected an abnormality of data flow (operation S1202: No), each of the routers determines whether there is an error of the path message received in operation S1201 (operation S1203). An error of a path message is, for example, mismatching of header information of the path message, etc. If there is no error of the path message (operation S1203: No), each of the routers ensures a path for the data flow on the basis of the path message received in operation S1201 (operation S1204).

Next, each of the routers transfers the path message received in operation S1201 to the subsequent-stage communication apparatus (operation S1205), and terminates a series of operation. In operation S1203, if there is an error of the path message (operation S1203: Yes), each of the routers returns a path error message 100 storing the contents of the error of the path message to the transmission source of the path message (operation S1206), and terminates a series of operation.

In operation S1202, if each of the routers has detected an abnormality of the data flow (operation S1202: Yes), each of the routers stores abnormality information indicating an abnormality of the data flow in the path error message 100 (operation S1207). Specifically, each of the routers stores the IP address of its own apparatus and "error code=32" in the error notification information 101 of the path error message 100.

Next, each of the routers returns the path error message 100 in which the abnormality information is stored in operation S1207 to the transmission source of the path message (operation S1208), and terminates a series of operation. By the above-described each operation, if each of the routers has detected an abnormality of a data flow, each of the routers transmits the abnormality information to the preceding-stage communication apparatus using the path error message 100.

Figure 13:
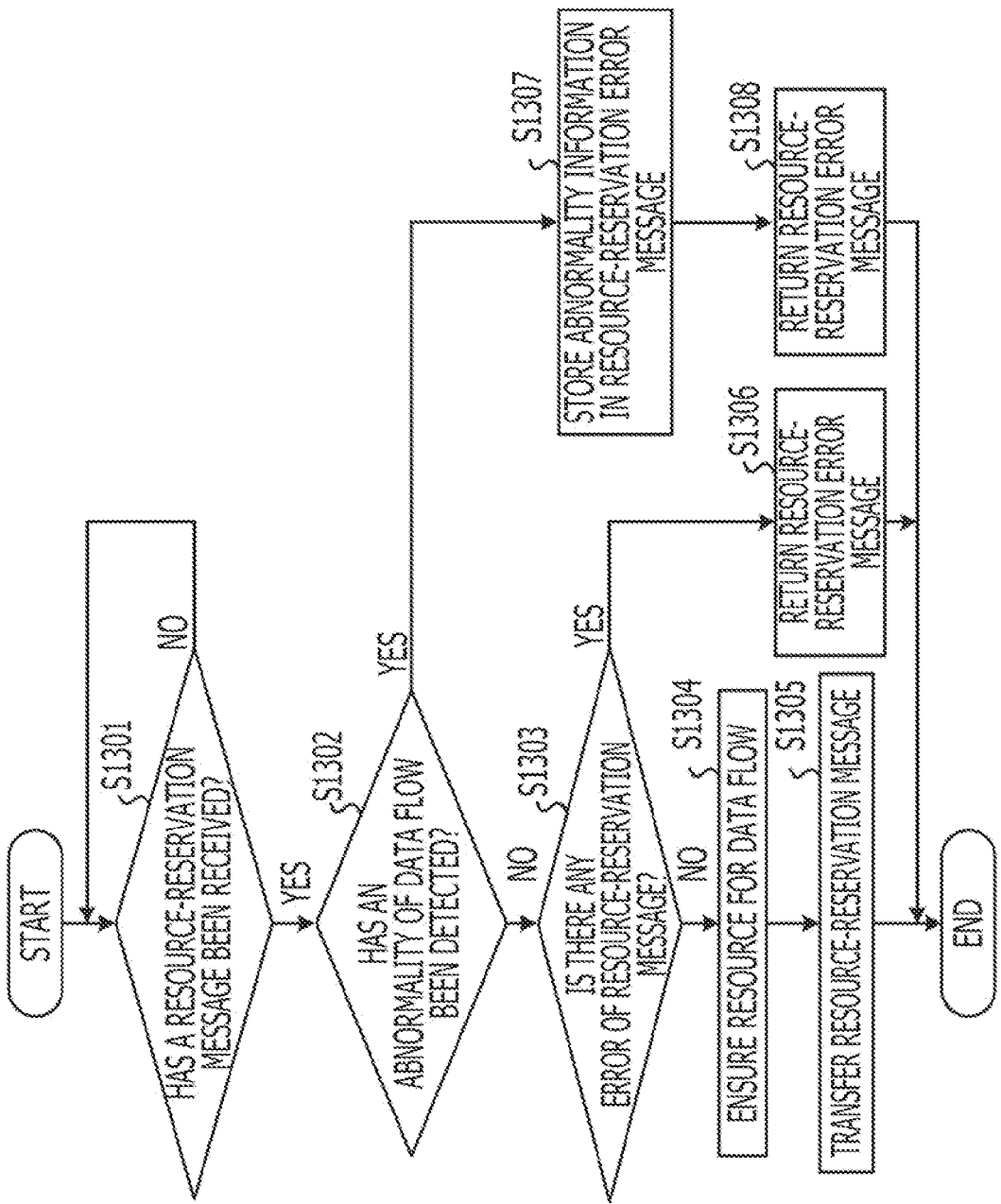
FIG. 13 is a flowchart illustrating an example of operation of a relay apparatus at the time of receiving a resource reservation message.

FIG. 13 is a flowchart illustrating an example of operation of a relay apparatus at the time of receiving a resource reservation message. First, each of the routers R1 to R4 determines whether a resource reservation message 90 is received or not from the subsequent-stage communication apparatus (operation S1301), and waits for reception of a resource reservation message 90 (operation S1301: a loop of No). If each of the routers receives a resource reservation message 90 (operation S1301: Yes), each of the routers refers to the alarm storage unit 86, and determines whether each of the routers has detected an abnormality of the data flow (operation S1302).

In operation S1302, if each of the routers has not detected an abnormality of a data flow (operation S1302: No), each of the routers determine whether there is an error of the resource reservation message 90 received in operation S1301 (operation S1303). An error of a resource reservation message 90 is, for example, mismatching of header information of the resource reservation message 90, etc.

In operation S1303, if there is no error of the resource reservation message 90 (operation S1303: No), each of the routers ensures resources for the data flow on the basis of the resource reservation message 90 received in operation S1301 (operation S1304). Next, each of the routers transfers the resource reservation message 90 received in operation S1301 to the preceding-stage communication apparatus (operation S1305), and terminates a series of operation.

In operation S1303, if there is an error of the resource reservation message 90 (operation S1303: Yes), each of the routers returns a resource-reservation error message 110 to the transmission source of the resource reservation message 90 (operation S1306), and terminates a series of operation. The resource-reservation error message 110 transmitted by operation S1306 is the resource-reservation error message 110 storing the contents of the error of the resource reservation message 90.

In operation S1302, if each of the routers has detected an abnormality of a data flow (operation S1302: Yes), each of the routers stores abnormality information in the resource-reservation error message 110 (operation S1307). Specifically, each of the routers stores the IP address of its own apparatus and "error code=32" in the error notification information 111 of the resource-reservation error message 110.

Next, each of the routers returns the resource-reservation error message 110 in which the abnormality information is stored in operation S1307 to the transmission source of the resource reservation message 90 (operation S1308), and terminates a series of operation. By the above-described each operation, if each of the routers has detected an abnormality of data flow, each of the routers transmits the abnormality information indicating an abnormality of the detected data flow to the subsequent-stage communication apparatus using the resource-reservation error message 110.

Figure 14:
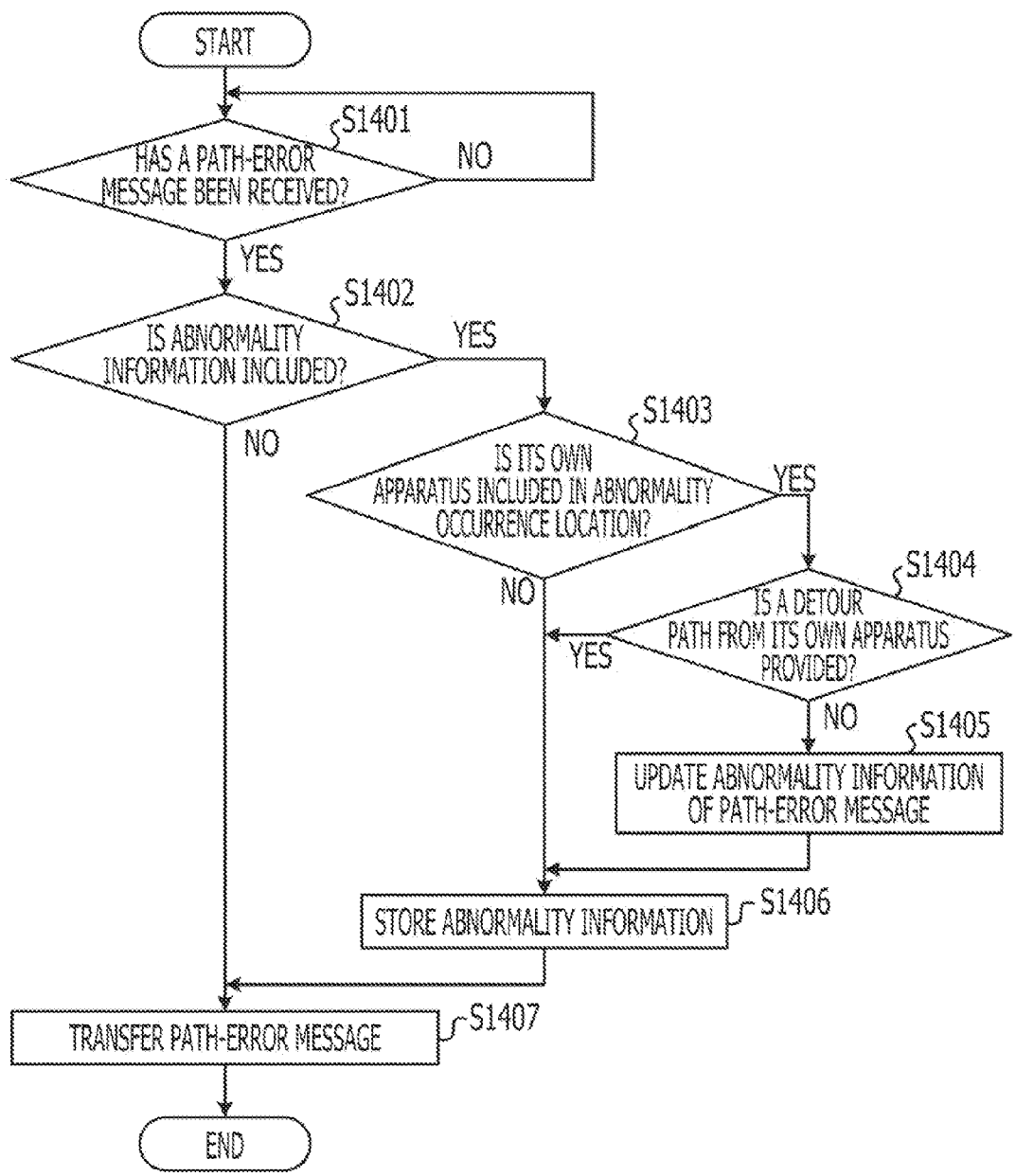
FIG. 14 is a flowchart illustrating an example of operation of a relay apparatus at the time of receiving a path error message.

FIG. 14 is a flowchart illustrating an example of operation of a relay apparatus at the time of receiving a path error message. First, each of the routers R1 to R4 determines whether a path error message 100 has been received or not from the subsequent-stage communication apparatus (operation S1401), and waits for reception of a path error message 100 (operation S1401: a loop of No).

In operation S1401, when each of the routers receives a path error message 100 (operation S1401: Yes), each of the routers determines whether abnormality information is stored or not in the received path error message 100 (operation S1402). The abnormality information is, for example, the IP address of the communication apparatus that has detected an abnormality, and "error code=32" or "error code=33".

In operation S1402, if abnormality information is stored in the path error message 100 (operation S1402: Yes), each of the routers determines whether its own apparatus is included in the abnormality occurrence location (operation S1403). For example, each of the routers obtains the IP address of the communication apparatus at which an abnormality is detected from the abnormality information, and compares the obtained IP address and the transmission-source IP address of the path error message 100. And if the individual IP addresses match, each of the routers determines that its apparatus is included in the abnormality occurrence location. Whereas, if the individual IP addresses do not match, each of the routers determines that its own apparatus is not included in the abnormality occurrence location.

In operation S1403, if its own apparatus is not included in the abnormality occurrence location (operation S1403: No), the processing proceeds to operation S1406. If its own apparatus is included in the abnormality occurrence location (operation S1403: Yes), each of the routers determines whether there is a detour path making a detour around the abnormality occurrence location through its own apparatus (operation S1404). If there is a detour path (operation S1404: Yes), the processing proceeds to operation S1406.

In operation S1404, if there is no detour path (operation S1404: No), each of the routers updates the abnormality information of the path error message 100 (operation S1405). Specifically, each of the routers stores "error code=33" in the error code 102 of the error notification information 101 of the path error message 100.

Next, each of the routers stores the abnormality information (operation S1406), and the processing proceeds to operation S1407. The abnormality information stored in operation S1406 is, for example, information indicating that there is no detour path making a detour around the abnormality occurrence location through the subsequent-stage communication apparatus. In operation S1402, if abnormality information is not stored (operation S1402: No), each of the routers transfers the path error message 100 received in operation S1401 to the preceding-stage communication apparatus (operation S1407), and terminates a series of operation.

By the above-described each operation, if a communication apparatus that has detected an abnormality is a subsequent-stage communication apparatus, it is possible to transmit abnormality information indicating whether there is a detour path making a detour around the subsequent-stage communication apparatus through its own apparatus to the preceding-stage communication apparatus. Also, if abnormality information indicating that there is no detour path making a detour around the abnormality occurrence location through the subsequent-stage communication apparatus is received from the subsequent-stage communication apparatus, each of the routers stores this abnormality information.

Figure 15:
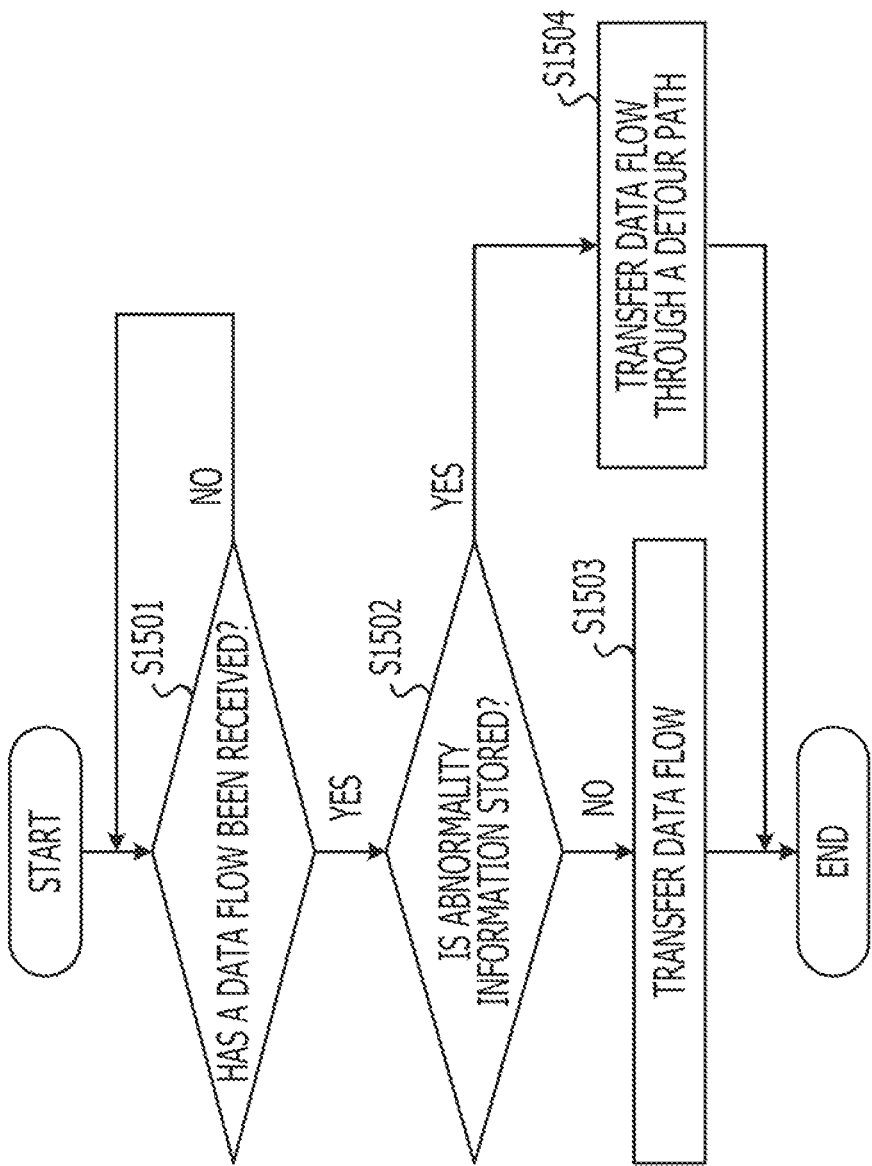
FIG. 15 is a flowchart illustrating an example of operation of a relay apparatus at the time of receiving a data flow.

FIG. 15 is a flowchart illustrating an example of operation of a relay apparatus at the time of receiving a data flow. First, each of the routers R1 to R4 determines whether a data flow has been received from the preceding-stage communication apparatus (operation S1501), and waits for the reception of a data flow (operation S1501: a loop of No). If a data flow is received (operation S1501: Yes), each of the routers determines whether abnormality information is stored or not by operation S1406 in FIG. 14 (operation S1502). The abnormality information in operation S1502 is the abnormality information indicating that there is no detour path making a detour around the abnormality occurrence location through the subsequent-stage communication apparatus.

In operation S1502, if abnormality information is not stored (operation S1502: No), each of the routers transfers the data flow (operation S1503), and terminates a series of operation. In operation S1503, each of the routers transfers the data flow through a path ensured by operation S1204 in FIG. 12 and resources ensured by operation S1304 in FIG. 13. In operation S1502, if abnormality information is stored (operation S1502: Yes), each of the routers transfers the data flow through a detour path making a detour around an IP address (location at which an abnormality has occurred) indicated by the abnormality information (operation S1504), and terminates a series of operation.

For example, the routing protocol process unit 84 stores a detour-path routing table to which a normal routing table is copied. Also, if the routing protocol process unit 84 receives abnormality information indicating that there is no detour path making a detour around an abnormality occurrence location through the subsequent-stage communication apparatus, the routing protocol process unit 84 excludes a subsequent-stage communication apparatus from transfer destinations in the detour-path routing table. And each of the routers transfers the data flow using a normal routing table in operation S1503, and transfers the data flow using a detour-path routing table in operation S1504.

A description will be given of management information of each of the relay apparatuses.

FIG. 16 is a diagram illustrating an example of information stored by each of the relay apparatuses in a state shown in FIG. 4. A table 160 shown in FIG. 16 illustrates an example of information stored by the routers R1 to R4 in the state shown in FIG. 4. As shown in the table 160, each of the routers R1 to R4 has "DestIP", "O inf", "NextHop", "Mon", "ErrST" and "RP".

"DestIP" indicates a destination IP address of a data flow. Here, in each of the routers R1 to R4, "DestIP" is set to the IP address, "GW2", of the gateway GW2.

"O inf (Output Interface)" indicates output interfaces that may be selected as the output destination of a data flow (transfer destination). Here, as output interfaces of the router R1, two entries, namely "R1 to R2" indicating the router R2, and "R1 to R3" indicating the router R3 are stored. Also, as output interfaces of the router R2, "R2 to R4" indicating the router R4 is stored. Also, as output interfaces of the router R3, "R3 to R4" indicating the router R4 is stored. Also, as output interfaces of the router R4, "R4 to GW2" indicating the gateway GW2 is stored.

"NextHop" indicates the next-hop IP address corresponding to the output interface. Here, as the next hop IP address corresponding to the output interfaces, "R1 to R2", of the router R1, the IP address, "R2", of the router R2, is stored. Also, as the next hop IP address corresponding to the output interfaces "R1 to R3" of the router R1, the IP address, "R3", of the router R3, is stored.

Also, as the next hop IP address corresponding to the output interfaces, "R2 to R4", of the router R2, the IP address, "R4", of the router R4, is stored. Also, as the next hop IP address corresponding to the output interfaces, "R3 to R4", of the router R3, the IP address, "R4", of the router R4, is stored. Also, the next hop IP address corresponding to the output interface "R4 to GW2" of the router R4 is the same as "DestIP", and thus no entry is stored.

"Mon (Monitor)" indicates a state of RTP/RTCP monitor. In the state shown in FIG. 4, no abnormality has occurred in any one of the paths. Accordingly, the RTP/RTCP monitor state of each of the routers R1 to R4 is set to "Normal", which indicates that no abnormality has occurred.

"ErrST (Error Status)" indicates an abnormality-information confirmation status. In the state shown in FIG. 4, no abnormality has occurred in any one of the paths, and thus the abnormality-information confirmation status of each of the routers R1 to R4 is set to "Normal", which indicates that no abnormality has occurred.

"RP (Routing Policy)" indicates a routing policy (higher priority is given to a smaller value) representing priority of each output interface. Here, as a routing policy corresponding to the output interfaces, "R1 to R2", of the router R1, "1" is set. Also, as a routing policy corresponding to the output interfaces, "R1 to R3", of the router R1, "2" is set. Also, as a routing policy corresponding to each output interface of the routers R2 to R4, "1" is set.

FIG. 17 is a diagram illustrating an example of information stored by each of the relay apparatuses in the state shown in FIG. 7. The table 170 shown in FIG. 17 illustrates an example of information stored by the routers R1 to R4 in the state shown in FIG. 7. As shown by the table 170, when the router R4 detects an abnormality 61, the RTP/RTCP monitor state of the router R4 is set to "Error", which indicates that an abnormality has occurred. And the abnormality information transmitted from the router R4 is received by the router R2.

When the router R2 receives the abnormality information from the router R4, the router R2 determines that its own apparatus is included in the abnormality occurrence location, and the router R2 sets the abnormality-information confirmation status of the router R2 to "Error", which indicates that its own apparatus is included in the abnormality occurrence location. Also, the router R2 sets the routing policy to "Unused", which is corresponding to the output interfaces "R2 to R4". "Unused" is information indicating unable to be selected. Also, the router R2 has no output interfaces other than the output interfaces "R2 to R4", and thus the router R2 transmits abnormality information indicating "no detour path from the router R2" to the router R1.

When the router R1 receives abnormality information from the router R2, and the abnormality information indicates "no detour path from the router R2", the router R1 sets the routing policy corresponding to the output interfaces "R1 to R2" to "Unused". Thereby, when the router R1 receives a data flow from the gateway GW1, the router R1 selects an output interface by excluding the output interfaces "R1 to R2".

Accordingly, in this case, the router R1 selects the output interfaces "R1 to R3". The router R1 transfers the data flow to the next hop IP address "R3", which is corresponding to the selected output interfaces "R1 to R3". Thereby, the data flow is transferred from the router R1 to the router R3.

When the router R3 receives the data flow from the router R1, and the output interfaces are "R3 to R4", and thus the router R3 selects the output interfaces "R3 to R4". And the router R3 transfers the data flow to the next hop IP address "R4" corresponding to the selected output interfaces "R3 to R4". Thereby, the data flow is transferred from the router R3 to the router R4. When the router R4 receives a data flow from the router R3, the router R4 transfers the data flow to the gateway GW2.

In this manner, in a communication system according to the embodiment, each of the relay apparatuses receives abnormality information of the transferred data flow from the subsequent-stage communication apparatus, and switches a transfer destination of the data flow on the basis of abnormality information. Thereby, if an abnormality of data flow occurs, the relay apparatus autonomously switches the transfer path of the data flow, making it possible to redress the abnormality of the data flow in a short time. Accordingly, it is possible to improve reliability of communication quality.

Also, without providing a server, etc., which centrally control the redressing of an abnormality of a data flow, it is possible to redress the abnormality of the data flow, and thus it is possible to reduce the cost of the communication system. Also, in the communication system according to the embodiment, it is possible to redress a silent failure (data flow abnormality) occurring between nodes using RSVP, which is a technique dynamically controlling the QoS function of a network. Thereby, for example, it is possible to redress an abnormality without transmitting and receiving a new signal for notifying the abnormality of the data flow.

As described above, by the relay apparatus, the relay method and the communication system, abnormality information of the transferred data flow is received from the subsequent-stage communication apparatus, and the transfer destination of the data flow is switched on the basis of the abnormality information so that the reliability of communication quality may be improved.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Although the embodiment(s) of the present invention(s) has (have) been described in detail, it should be understood that the various changes, substitutions, and alterations could be made hereto without departing from the spirit and scope of the invention.

What is claimed is:

1. A relay apparatus comprising:
    a transfer unit to transfer data from a preceding-stage communication apparatus to a subsequent-stage communication apparatus;
    a receiving unit to receive abnormality information indicating an abnormality of the data transferred by the transfer unit from the subsequent-stage communication apparatus; and
    a switching unit to switch a transfer destination of the data by the transfer unit on a basis of the abnormality information received by the receiving unit,
    wherein the abnormality information includes information indicating whether a detour path includes the subsequent-stage communication apparatus, and
    when the abnormality information of the abnormality and the subsequent-stage communication apparatus being not included in the detour path are detected, the switching unit switches the transfer destination, and when the abnormality information of the abnormality and the subsequent-stage communication apparatus being included in the detour path are detected, the switching unit does not switch the transfer destination, in a case of the relay apparatus being included in the detour path.

2. The relay apparatus according to claim 1, further comprising a transmission unit to transmit the abnormality information received by the receiving unit to the preceding-stage communication apparatus.

3. The relay apparatus according to claim 2, further comprising a detection unit to detect an abnormality of the data from the preceding-stage communication apparatus, and
    the transmission unit transmits the abnormality information indicating the abnormality detected by the detection unit to the preceding-stage communication apparatus.

4. The relay apparatus according to claim 3,
    wherein the abnormality information includes information indicating a communication apparatus has detected the abnormality, and
    when the communication apparatus having detected the abnormality is the subsequent-stage communication apparatus, the transmission unit transmits the abnormality information indicating whether a detour path making a detour around the subsequent-stage communication apparatus through its own apparatus is provided or not.

5. The relay apparatus according to claim 1,
    wherein the abnormality information is included in an RSVP (Resource reSerVation Protocol) control message.

6. The relay apparatus according to claim 1,
    the transfer unit includes a notification part to notify a user of the abnormality based on the abnormality information received by the receiving unit.

7. A method of relaying data, comprising:
    transferring data from a preceding-stage communication apparatus to a subsequent-stage communication apparatus;
    receiving abnormality information indicating an abnormality of the data from the subsequent-stage communication apparatus; and
    switching a transfer destination of the data on a basis of the abnormality information received,
    wherein the abnormality information includes information indicating whether a detour path includes the subsequent-stage communication apparatus, and
    switching the transfer destination when the abnormality information of the abnormality and the subsequent-stage communication apparatus being not included in the detour path are detected.

8. The method of relaying data according to claim 7, further comprising transmitting the abnormality information received by the receiving unit to the preceding-stage communication apparatus.

9. The method of relaying data according to claim 8, further comprising detecting an abnormality of the data from the preceding-stage communication apparatus, and transmitting the abnormality information indicating the abnormality detected to the preceding-stage communication apparatus.

10. The method of relaying data according to claim 9,
wherein the abnormality information includes information indicating a communication apparatus has detected the abnormality, and
when the communication apparatus having detected the abnormality is the subsequent-stage communication apparatus, transmitting the abnormality information indicating whether a detour path making a detour around the subsequent-stage communication apparatus through its own apparatus is provided or not.

11. The method of relaying data according to claim 7, further comprising notifying a user of the abnormality based on the abnormality information received by the receiving unit.

12. A communication system comprising:
a plurality of relay apparatuses forming a path for transferring data,
each of the plurality of relay apparatuses including:
    a transfer unit to transfer data from a preceding-stage communication apparatus to a subsequent-stage communication apparatus;
    a receiving unit to receive abnormality information indicating an abnormality of the data transferred by the transfer unit from the subsequent-stage communication apparatus; and
    a switching unit to switch a transfer destination of the data by the transfer unit on a basis of the abnormality information received by the receiving unit,
wherein the abnormality information includes information indicating whether a detour path includes the subsequent-stage communication apparatus, and
when the abnormality information of the abnormality and the subsequent-stage communication apparatus being not included in the detour path are detected, the switching unit switches the transfer destination, and when the abnormality information of the abnormality and the subsequent-stage communication apparatus being included in the detour path are detected, the switching unit does not switch the transfer destination, in a case of the relay apparatus being included in the detour path.

13. The communication system according to claim 12, further comprising a transmission unit to transmit the abnormality information received by the receiving unit to the preceding-stage communication apparatus.

14. The communication system according to claim 13, further comprising a detection unit to detect an abnormality of the data from the preceding-stage communication apparatus, and
the transmission unit transmits the abnormality information indicating the abnormality detected by the detection unit to the preceding-stage communication apparatus.

15. The communication system according to claim 14,
wherein the abnormality information includes information indicating a communication apparatus has detected the abnormality, and
when the communication apparatus having detected the abnormality is the subsequent-stage communication apparatus, the transmission unit transmits the abnormality information indicating whether a detour path making a detour around the subsequent-stage communication apparatus through its own apparatus is provided or not.

16. The communication system according to claim 12,
wherein the abnormality information is included in an RSVP (Resource reSerVation Protocol) control message.

17. The communication system of according to claim 12,
the transfer unit includes a notification part to notify a user of the abnormality based on the abnormality information received by the receiving unit.

* * * * *